United States Patent
Ohara et al.

(10) Patent No.: US 7,440,618 B2
(45) Date of Patent: Oct. 21, 2008

(54) APPARATUS FOR EXTRACTING RULES LINE FROM MULTIPLE-VALUED IMAGE

(75) Inventors: Atsuko Ohara, Kawasaki (JP); Katsuhito Fujimoto, Kawasaki (JP); Satoshi Naoi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 230 days.

(21) Appl. No.: 10/941,863

(22) Filed: Sep. 16, 2004

(65) Prior Publication Data

US 2005/0031208 A1 Feb. 10, 2005

Related U.S. Application Data

(62) Division of application No. 09/917,748, filed on Jul. 31, 2001.

(30) Foreign Application Priority Data

Aug. 15, 2000 (JP) ............................... 2000-246207
Mar. 8, 2001 (JP) ............................... 2001-064194

(51) Int. Cl.
  G06K 9/46 (2006.01)
  G06K 9/48 (2006.01)
(52) U.S. Cl. ...................................... 382/193; 382/199
(58) Field of Classification Search ................ 382/192, 382/193, 195, 199, 270, 272
See application file for complete search history.

(56) References Cited

U.S. PATENT DOCUMENTS

| | | | | |
|---|---|---|---|---|
| 4,718,090 A | * | 1/1988 | Cooper, Jr. | 382/204 |
| 5,341,437 A | * | 8/1994 | Nakayama | 382/104 |
| 5,933,525 A | * | 8/1999 | Makhoul et al. | 382/186 |
| 6,015,089 A | * | 1/2000 | Hecht et al. | 235/462.16 |
| 6,185,329 B1 | * | 2/2001 | Zhang et al. | 382/176 |

FOREIGN PATENT DOCUMENTS

| | | |
|---|---|---|
| JP | 60-73408 | 4/1985 |
| JP | 4-77973 | 3/1992 |
| JP | 6-203165 | 7/1994 |
| JP | 6-309498 | 11/1994 |

OTHER PUBLICATIONS

Japanese Patent Office Notice of Rejection Grounds, mailed Oct. 3, 2006, and issued in corresponding Japanese Patent Application No. 2001-064194.

Nobuyuki Otsu, "An Automatic Threshold Selection Method Based on Discriminant and Least Squares Criteria" The Transactions of the Institute of Electronics and Communication Engineers of Japan, vol. J63-D No. 4, Apr. 25, 1980, pp. 350 3.1 & 351 3.2.

* cited by examiner

*Primary Examiner*—Brian Q Le
(74) *Attorney, Agent, or Firm*—Staas & Halsey LLP

(57) ABSTRACT

A rather expanded binary image and a rather blurry binary image are generated from a multiple-valued image. A ruled line candidate area is extracted from the rather expanded binary image, and the extracted ruled line candidate area is verified using the rather blurry binary image.

8 Claims, 29 Drawing Sheets

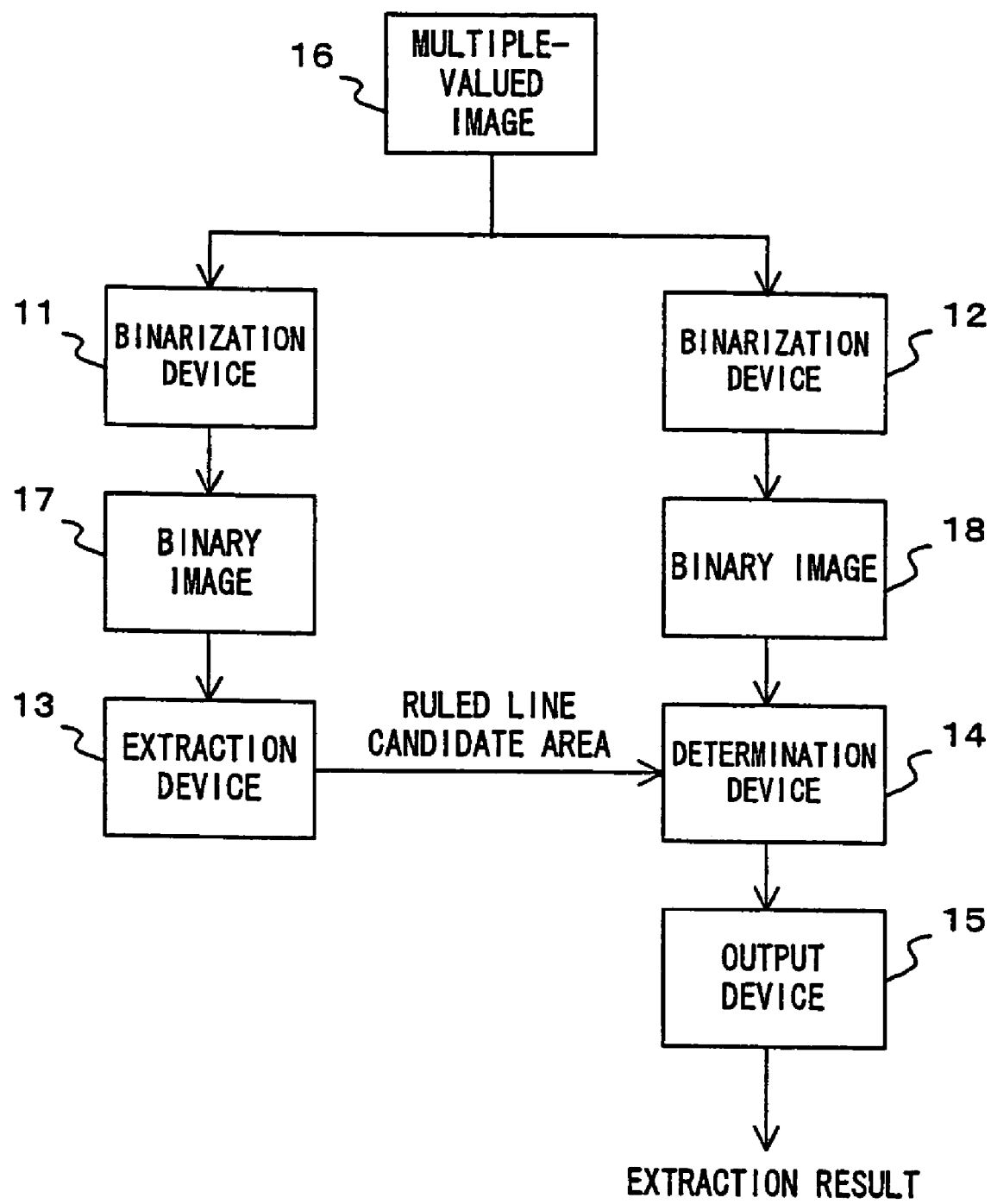
F I G. 1

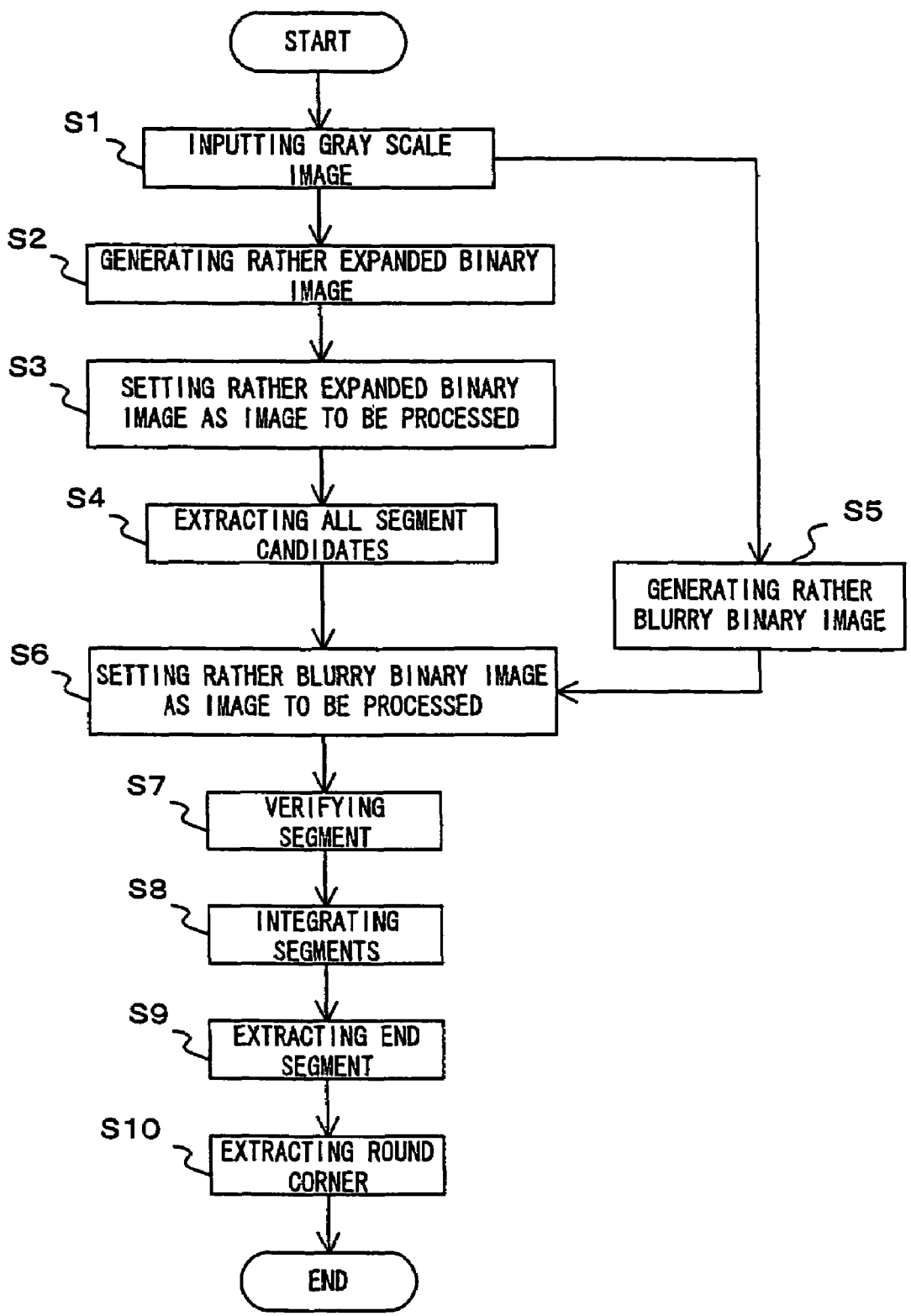
F I G. 2

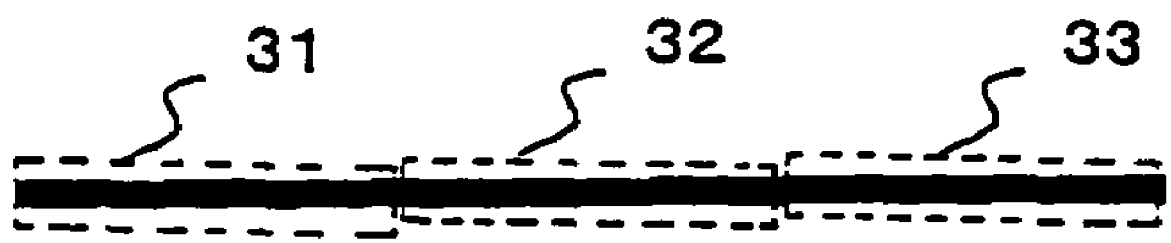
F I G. 4

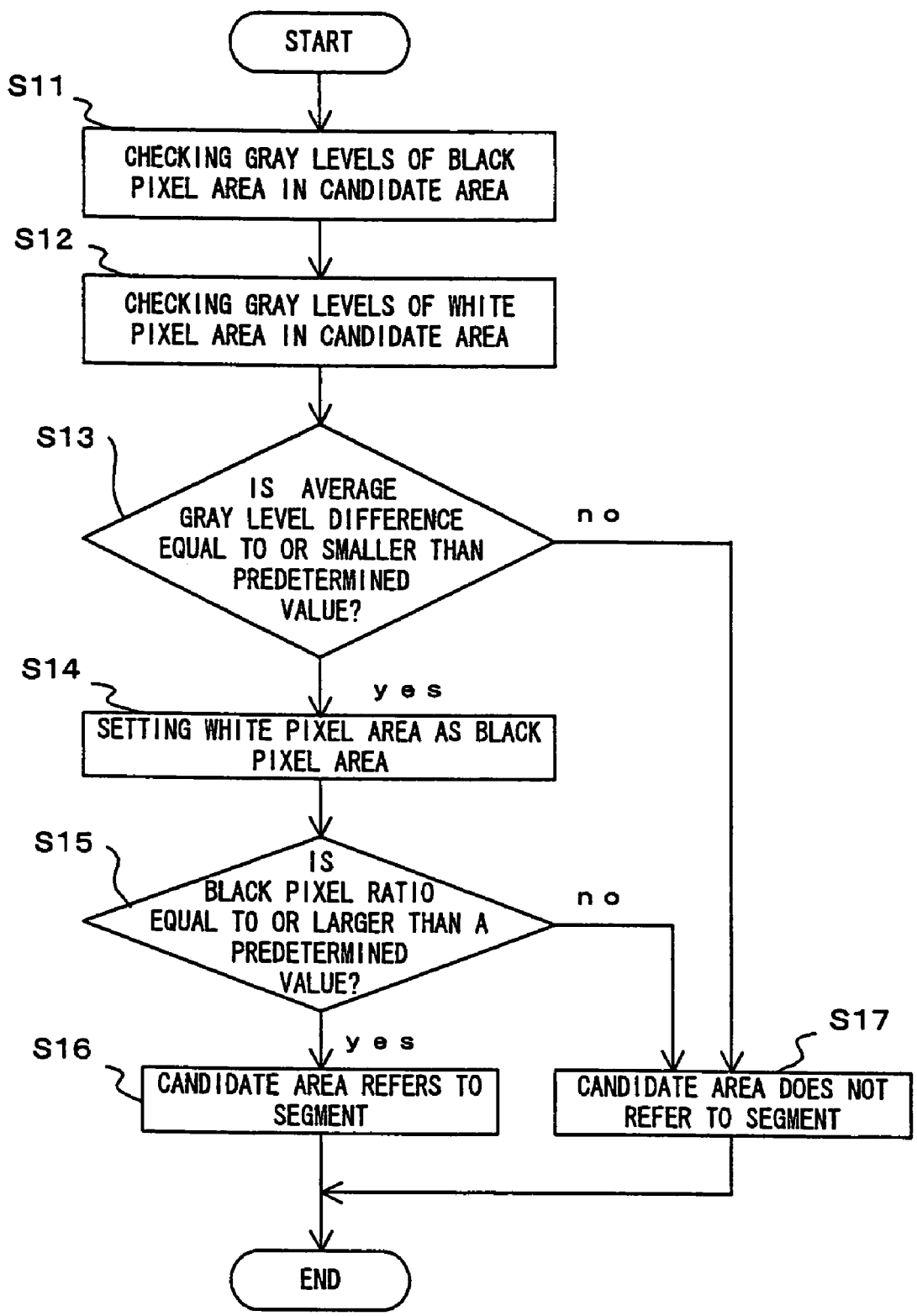
F I G. 5

F I G. 1 0

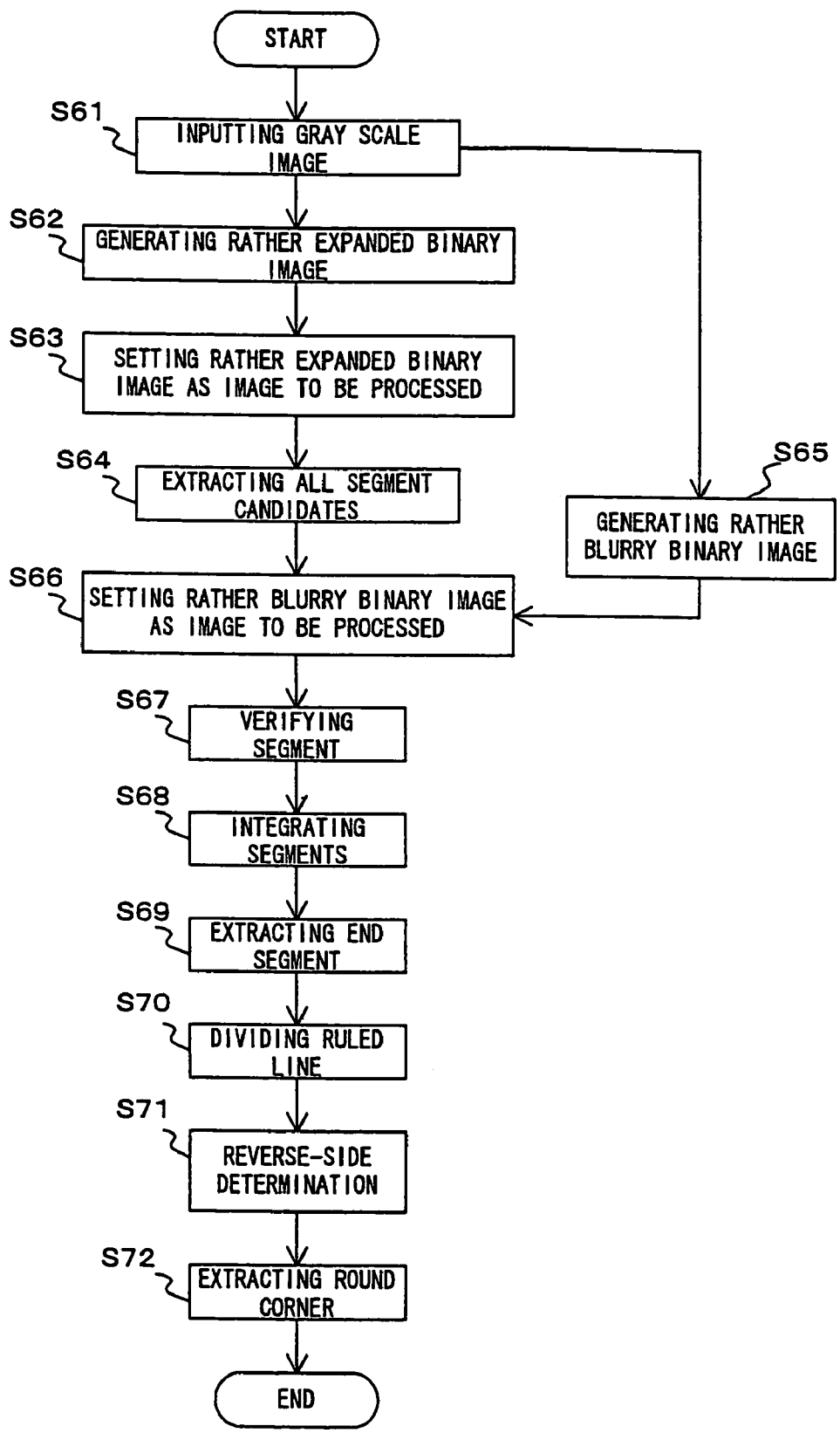
F I G. 2 3

APPARATUS FOR EXTRACTING RULES LINE FROM MULTIPLE-VALUED IMAGE

This application is a Divisional of application Ser. No. 09/917,748, filed Jul. 31, 2001, now pending.

BACKGROUND OF THE INVENTION

1. Field of the Invention

The present invention relates to a ruled line extraction apparatus for extracting a ruled line from a multiple-valued image such as a gray scale image, a color image, etc., and pattern extraction apparatus for extracting an arbitrary pattern from a multiple-valued image.

2. Description of the Related Art

Recently, with an increasing number of input units such as scanners, etc., a larger number of images are processed in documents by computers, and a demand for an OCR (optical character reader) has outstandingly grown. The OCR is provided for a user as software or a character recognition device.

When an image input through an input unit is a gray scale image, it is necessary for the character recognition device to binarize the image in an appropriate method. Especially, when a non-contacting type image input device such as an OHR (overhead reader) is used, the resultant image frequently has uneven gray levels, dark, distortion, etc. as compared with the image obtained by a scanner. Therefore, it is necessary to appropriately binarize the image.

The conventional binarizing method refers to global binarization in which the entire image is binarized using the same threshold, and local binarization in which the image is binarized for each of local areas.

However, when a ruled line is extracted from a gray scale image in a document containing ruled lines such as a slip, etc., the above mentioned conventional binarizing method has the following problems.

In the global binarization, an image can have a dark portion, and therefore a binarization result may indicate a blur, an expansion, etc. of a pattern when the gray level of the image partially fluctuates, thereby failing in correctly extracting ruled lines.

Furthermore, in the local binarization, the influence of the dark portion can be reduced. However, since the binarizing process is performed on an area around a target pixel, there is the possibility that a ruled line is mis-recognized as a background when a thick character exists near a thin ruled line. Furthermore, the noise caused by uneven gray levels, etc. can be binarized and recognized as a black pattern, thereby disadvantageously affecting a ruled line extracting process.

In any of the above mentioned binarizing methods, a binarization result often indicates a blur, an expansion, etc. when there is little difference in gray level between a ruled line and its background, thereby failing in correctly performing a binarizing process.

Thus, the conventional global and local binarization cannot always obtain an acceptable binary image without a blur and an expansion. Therefore, when a ruled line extracting process is performed using an obtained binary image, a blur or an expansion possibly prevents the extracting process from being correctly performed.

In a slip, etc., a ruled line, a character, a pattern such as graphics, etc. written on the reverse side, and in a brochure, a pattern written on the next page can slightly be seen through paper. In this case, an input image can show the pattern from the reverse side or the next page. Therefore, an undesired reverse-side pattern can be extracted when a specified pattern is extracted from an input image.

SUMMARY OF THE INVENTION

The first object of the present invention is to provide a ruled line extraction apparatus capable of correctly extracting a ruled line although a gray scale image has a dark portion or there is little difference in gray level between the ruled line and its background.

The second object of the present invention is to provide a pattern extraction apparatus for correctly extracting a necessary pattern when an arbitrary pattern including a ruled line is extracted from a multiple-valued image such as a gray scale image, etc.

In the first aspect of the present invention, the ruled line extraction apparatus includes a first binarization device, a second binarization device, an extraction device, a determination device, and an output device.

The first binarization device binarizes a multiple-valued image to generate a first binary image. The second binarization device binarizes the multiple-valued image in a method different from the method of the first binarization device to generate a second binary image. The extraction device extracts a ruled line candidate area using the first binary image. The determination device determines using the second binary image whether or not the extracted ruled line candidate area corresponds to a ruled line. Then, the output device outputs the information about the ruled line candidate area which has been recognized as corresponding to a ruled line.

In the second aspect according to the present invention, the pattern extraction apparatus includes an extraction device, a determination device, and an output device.

The extraction device extracts an area to be determined from a multiple-valued image. The determination device obtains an evaluation value based on a change of a gray level in a direction vertical to the tangent direction of the contour line for the contour portion of the pattern in the area to be determined. If the evaluation value is equal to or larger than a predetermined value, it is determined that the area to be determined is a necessary pattern area. If the evaluation value is smaller than the predetermined value, it is determined that the area to be determined is an unnecessary pattern area. The output device outputs the information about the necessary pattern area.

BRIEF DESCRIPTION OF THE DRAWINGS

FIG. 1 shows the principle of the ruled line extraction apparatus according to the present invention;

FIG. 2 is a flowchart of a first ruled line extracting process;

FIG. 4 shows first line candidates;

FIG. 5 is a flowchart of a segment verifying process;

FIG. 10 shows a gray scale image containing round corners;

FIG. 23 is a flowchart of the second ruled line extracting process;

DESCRIPTION OF THE PREFERRED EMBODIMENTS

Figure 3:
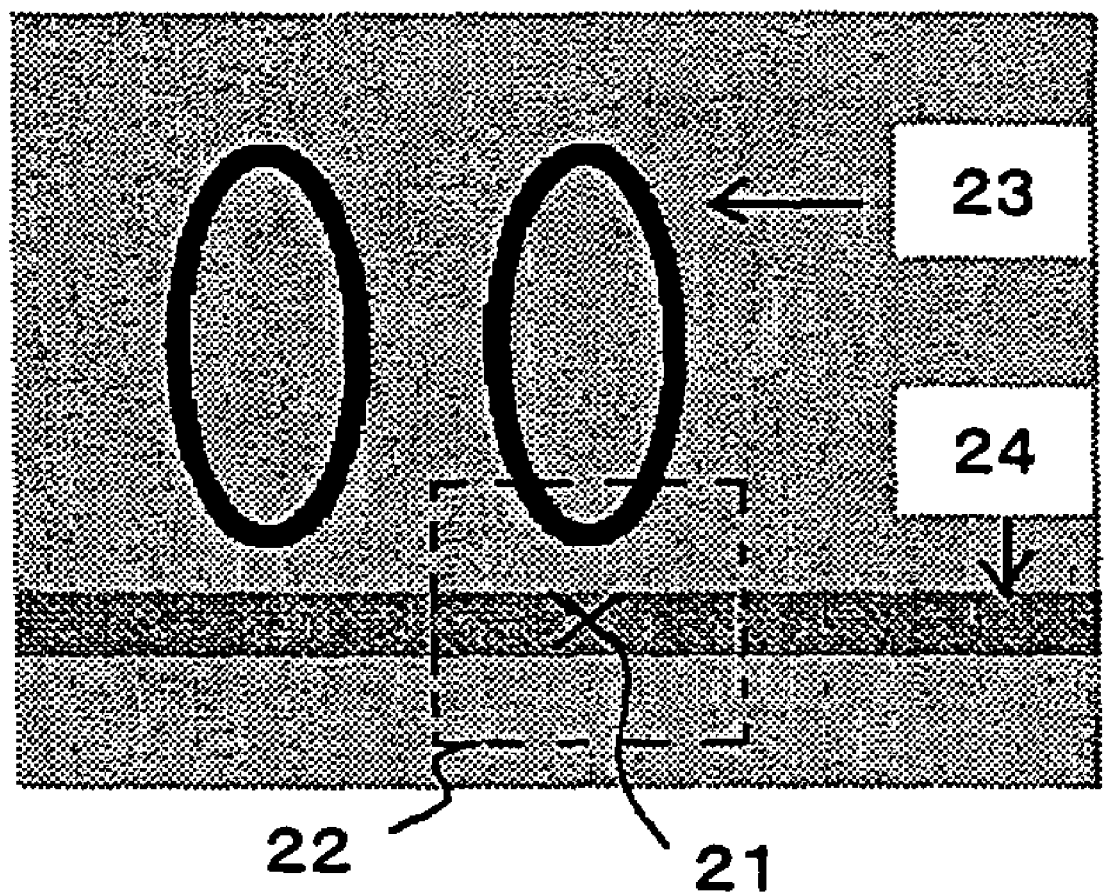
FIG. 3 shows two types of black areas.

The embodiments of the present invention are described below in detail by referring to the attached drawings.

FIG. 1 shows, the principle of the ruled line extracting process according to the present invention. The ruled line extracting process shown in FIG. 1 comprises binarization devices 11 and 12, an extraction device 13, a determination device 14, and an output device 15.

The binarization device 11 binarizes a multiple-valued image 16 to generate a first binary image 17. The binarization device 12 binarizes the multiple-valued image in a method different from the method of the binarization device 11 to generate a second binary image 18. The extraction device 13 extracts a ruled line candidate area using the binary image 17. The determination device 14 determines using the binary image 18 whether or not the extracted ruled line candidate area corresponds to a ruled line. The output device 15 outputs the information about the ruled line candidate area which has been recognized as corresponding to a ruled line.

The binarization device 11 generates from the input multiple-valued image 16 the binary image 17 from which all ruled line candidate areas can be extracted. The binarization device 12 generates, from the multiple-valued image 16 the binary image 18 in which a ruled line candidate area can be correctly verified. As the binary image 17, for example, a rather expanded binary image containing a expanded pattern is generated. As the binary image 18, for example, a rather blurry binary image with a thin pattern portion omitted is generated.

The extraction device 13 extracts a ruled line candidate area from the rather expanded binary image 17. The determination device 14 determines using the rather blurry binary image 18 whether or not the candidate area corresponds to an actual ruled line. Then, the output device 15 outputs only the area corresponding to a ruled line as an extraction result.

Thus, the obtained two types of binary images can be used for respective purposes by binarizing a multiple-valued image in two different methods. Then, a ruled line candidate area is extracted using one binary image, and the ruled line candidate area is verified using the other binary image, thereby correctly extracting the ruled line.

Figure 28:
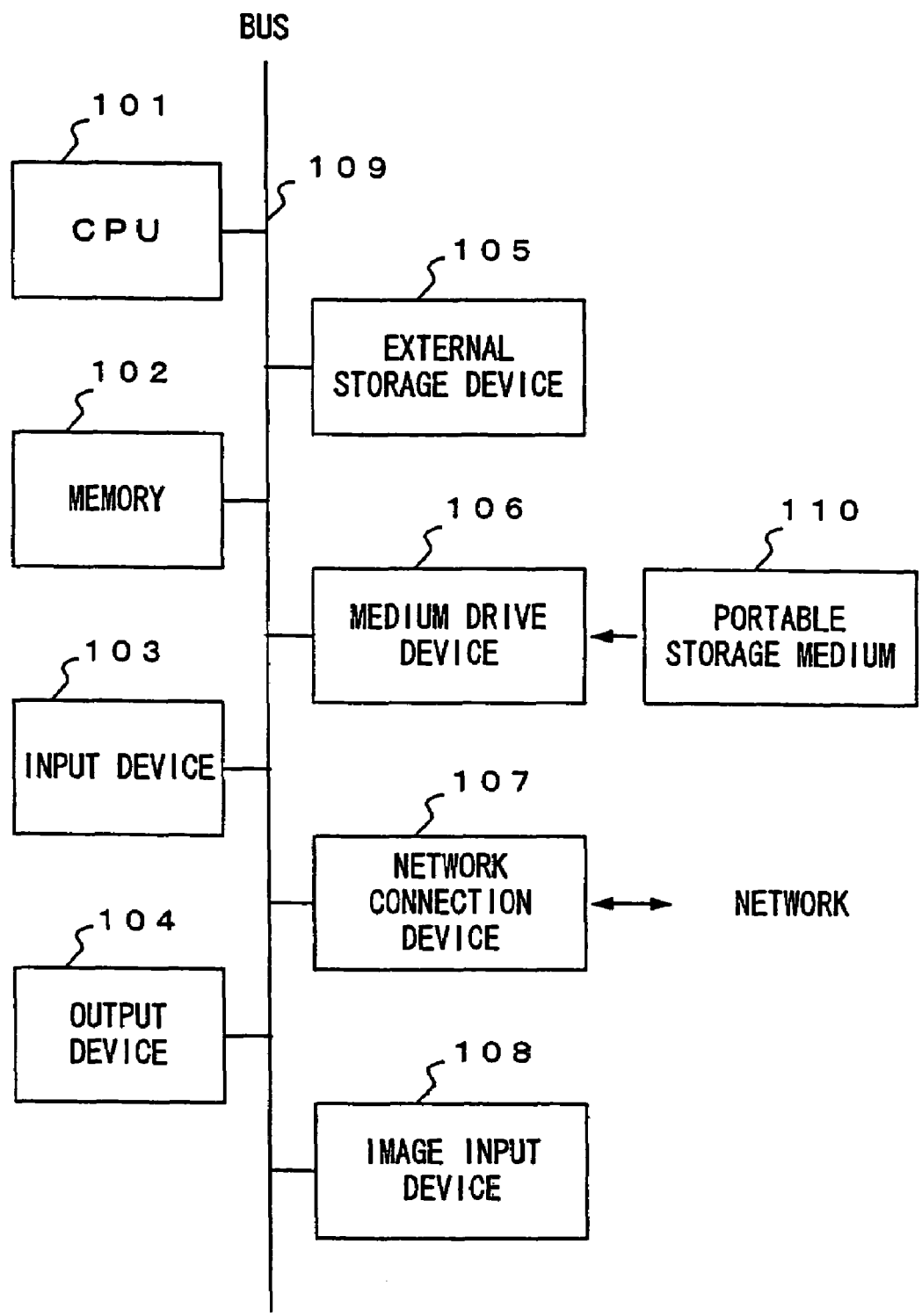
FIG. 28 shows the configuration of the information processing device.

For example, the binarization devices 11 and 12, the extraction device 13, and the determination device 14 shown in FIG. 1 correspond to the combination of a CPU (central processing unit) 101 and memory 102 shown in FIG. 28, and the output device 15 shown in FIG. 1 corresponds to an output device 104 shown in FIG. 28.

Furthermore, in the second aspect of the present invention, the pattern extraction apparatus comprises an extraction device, a determination device, and an output device. For example, the extraction device and the determination device correspond to the combination of the CPU 101 and the memory 102 shown in FIG. 28, and the output device corresponds to the output device 104 shown in FIG. 28.

The extraction device extracts an area to be determined from a multiple-valued image. The determination device obtains an evaluation value based on a change of a gray level in a direction vertical to the tangent direction of the contour line for the contour portion of the pattern in the area to be determined. If the evaluation value is equal to or larger than a predetermined value, it is determined that the area to be determined is a necessary pattern area. If the evaluation value is smaller than the predetermined value, it is determined that the area to be determined is an unnecessary pattern area. The output device outputs the information about the necessary pattern area.

The extraction device extracts from the multiple-valued image the area to be determined for determination as to whether or not a necessary pattern is contained. For the contour portion of the pattern contained in the area, the determination device computes the evaluation value based on the change of the gray level in the direction vertical to the tangent direction of the contour line. If the evaluation value is equal to or larger than a predetermined value, it is determined that the area to be determined is an area containing a necessary pattern area. If the evaluation value is smaller than the predetermined value, it is determined that the area to be determined is an area containing an unnecessary pattern area. Then, the output device outputs only the necessary pattern area as an extraction result.

Normally, the contour of a pattern on the reverse side appears blurry and blotting as compared with the pattern on the right side. The blurry contour of the pattern on the reverse side indicates that there is a small change in the gray level from the contour to the inside of the pattern. On the other side, when the contour is clear, a change in the gray level is large.

Therefore, using an evaluation value corresponding to a gray level change in a direction vertical to the tangent direction of a contour line, it can be determined whether an extracted pattern is written on the right side (necessary pattern) or a pattern written on the reverse side (unnecessary pattern). By performing such determination, only a pattern area of the pattern on the right side can be output as a necessary pattern area with the pattern area of an unnecessary pattern written on the reverse side excluded from an extracted pattern area.

According to the present embodiment, the two types of binary images obtained from a gray scale image in the two different processes, and the original gray scale image are appropriately used depending on the purpose of each process to extract a ruled line. These binary images can be a rather blurry binary image and a noisy and rather expanded binary image.

First, the position of a ruled line candidate is detected using a rather expanded binary image. Using the rather expanded binary image, a ruled line candidate area can be extracted without considering an influence of a blur. Then, it is determined using a rather blurry binary image and a gray scale image whether or not an area extracted as a ruled line candidate is actually a ruled line. At this time, the gray level of the area in which the binarization result indicates black is compared with the gray level of the area in which the binarization result indicates white, and the areas having small gray level difference are integrated, thereby extracting a ruled line portion.

Thus, in the process of extracting a ruled line from a gray scale image, a rather blurry binary image and a rather expanded binary image are generated from a gray scale image. As a result, the different binary images can be used depending on the purposes, thereby correctly extracting a ruled line portion.

A gray scale image having gray level information is to be processed, and contains an image input through a contacting type input device such as a scanner, etc., and an image input through a non-contacting type input device such as an OHR, etc. Regardless of the existence of a dark portion on an image, the image is to be processed although the gray level of a ruled line is thin. A ruled line to be extracted is normally assumed to be indicated by a solid line. A dotted ruled line is not always considered.

FIG. 2 is a flowchart of the process performed by the ruled line extraction apparatus according to the present embodiment. The ruled line extraction apparatus first inputs a gray scale image (step S1), generates a rather expanded binary image (step S2), and sets the binary image as a process target (step S3). Then, a process of extracting all segment candidates is performed, and an area having high black pixel density in the horizontal and vertical directions is extracted as a ruled line candidate area (step S4).

Then, a rather blurry binary image is generated from the gray scale image (step S5), and the binary image is set as a process target (step S6). Then, a segment verifying process is performed, and it is determined whether or not the ruled line candidate area extracted in step S4 is actually a ruled line (step S7). Then, a segment integrating process is performed (step S8), an end segment extracting process is performed (step S9), a round corner extracting process is performed (step S10), thereby terminating the process.

Then, each process shown in FIG. 2 is concretely explained by referring to FIG. 3 through FIG. 13.

In the process shown in FIG. 2, two types of binary images, that is, a rather expanded binary image without a blur, and a rather blurry binary image without an expansion, are generated when stroke pixels (pattern) such as a character, a ruled line, etc. are extracted from an input gray scale image.

Normally, to obtain a stable binary image without a dark portion or uneven gray levels, Niblack's local binarization is performed to supplement the binarization performed using a predetermined threshold. The Niblack's local binarization refers to a method of performing a binarizing process on each pixel using the threshold of each pixel $T=E+K\sigma$ (E indicates an average value of the gray levels of the pixels in the vicinal area of a target pixel, $\sigma$ indicates a standard deviation of the gray levels of the pixels in the vicinal area of the target pixel, and K indicates a predetermined constant). The vicinal area of the pixels is an N×N (N indicates a constant) rectangular area with the target pixel located in the center of the area.

However, when the method is used as is, the gray levels of all pixels in the vicinal area are even in the background and inside a thick line. Therefore, noise occurs in the scattering manner. In the present embodiment, the binarizing process through the background discrimination described in the prior patent application 'Image Processing Device and Image Processing Method' (Japanese Patent Application Laid-open No. 11-335495) is used as a basic binarizing process to remove the scattered noise.

In this method, the background discriminating process for discriminating whether or not a target pixel refers to a background according to the information obtained for each vicinal area is performed together with the Niblack's local binarization. For example, assuming that the pixels recognized as white using the local threshold T of a target pixel are defined as white pixels, and the pixels recognized as black using the threshold T are defined as black pixels, thereby defining the average gray level difference $\Delta g$ by the following equation.

$\Delta g$=average gray level of white pixels in the vicinal area−average gray level of black pixels in the vicinal area At this time, if $\Delta g$ is smaller than a predetermined threshold $\Delta g_{min}$, then the target pixel is recognized as the background, and the Niblack's local binarization is performed on the pixels which are not recognized as the background. In the above mentioned background discriminating process, an acceptable binarization result can be obtained with a blur or noise successfully reduced even on an image having a dark portion.

In step S2 shown in FIG. 2, if the ruled line extraction apparatus performs a binarizing process with the background discrimination on a gray scale image, and the target pixel is recognized as a white pixel, then the binarizing process with the background discrimination is performed again on the pixel. In the second binarizing process with the background discrimination, the pixel recognized as a black pixel in the vicinal area (local area) containing the target pixel in the center is removed from the process target.

For example, when there are black areas 23 and 24 having different gray levels in a vicinal area 22 of a target pixel 21 (pixel marked with x) on the ruled line as shown in FIG. 3, The target pixel 21 in the black area 24 may be recognized as a white pixel when the binarizing process is performed once. However, the second binarizing process performed with the black area 23 excluded can correctly recognize the target pixel 21 as a black pixel.

However, although the black area 24 is much thinner than the black area 23, the target pixel 21 is recognized as a black pixel. Thus, in the binarizing process in step S2, the portion, which is not expected to be recognized as a black pixel, can be recognized as a black pixel. Therefore, a stroke can be expanded or noise can increase. As a result, an obtained binary image is a rather expanded binary image, but almost without a blur.

Thus, when a target pixel is recognized as a white pixel as a result of the first local binarization, the local binarization is performed again only on the pixels recognized as white pixels in the vicinal area of the target pixel. Accordingly, although there is a thick character pattern near a thin ruled line, the ruled line portion can be prevented from being mis-recognized as white pixels.

In this example, in the second binarizing process, the pixels recognized as black pixels in the first binarizing process are excluded. Instead of this, the form of the vicinal area can be changed. For example, as a vicinal area in the second process, a plurality of areas are used including a vertically-long area, a horizontally-long area, a diagonal area, etc. containing the target pixel. If any of a plurality of discrimination results with the areas indicates the target pixel recognized as a black pixel, the target pixel is recognized as a black pixel.

Thus, although there is a thick character pattern near a thin ruled line, the ruled line portion can be prevented from being mis-recognized as white pixels by changing the form of the vicinal area and then performing the local binarization again.

In step S5 shown in FIG. 2, if the ruled line extraction apparatus performs a binarizing process with the background discrimination on a gray scale image, and the target pixel is recognized as a white pixel, then the average gray level of the black pixels in the vicinal area of the target pixel is compared with the average gray level of the white pixels in the vicinal area, and it is then determined whether or not the binarizing process is to be performed again. If the two average gray levels satisfy a predetermined condition, then the second binarizing process with the background discrimination is performed. The condition can be presented as follows.

(1) The ratio of the average gray levels in the vicinal area is equal to or larger than a predetermined value.
(2) The difference of the average gray levels in the vicinal area is equal to or larger than a predetermined value.
(3) The ratio and the difference of the average gray levels in the vicinal area are equal to or larger than a predetermined value.

For example, the average gray level ratio and the average gray level difference can be defined by the following equation.

average gray level ratio=average gray level of white pixels/average gray level of black pixels average gray level difference=average gray level of white pixels−average gray level of black pixels Only when such a condition is satisfied, the second binarizing process is performed. In this case, as in the process in step S2, a pixel recognized as a black pixel in the vicinal area containing the target pixel in the center is to be excluded from the pixels to be processed, or the form of the vicinal area is changed to perform the second binarizing process.

If it is determined that the target pixel is a white pixel, and the average gray level ratio or the average gray level difference in the vicinal area is large, then there is the possibility that thick black pixels exist outside the target pixel. Then, to correctly binarize the target pixel, the discriminating process is performed again after excluding the portion of the thick black pixels other than the target pixel. However, when the average gray level ratio or the average gray level difference is small, then the second binarizing process is not performed, thereby still holding a blur.

In the background discriminating process according to the prior patent application, pixels are discriminated based on the average gray level difference. However, according to the present invention, a new determination criterion of 'contour rate' is defined. The contour rate refers to the value indicating the complexity of the distribution (pattern) of black pixels in the vicinal area having the target pixel in the center, and is represented by the number of contours/the number of black pixels. The number of contours refers to the number of white pixels touching a black pixel in the vicinal area, and the number of black pixels refers to the number of black pixels in the vicinal area. When the value of the contour rate becomes equal to or larger than a predetermined value, the target pixel is recognized as the background, and its binarization result is white.

Thus, if the contour rate is defined as a discrimination criterion, and it indicates a value equal to or larger than a predetermined value, the target pixel is recognized as the background so that the noise in the background can be removed, and an acceptable binary image can be obtained.

As described above, if the target pixel is recognized as a white pixel as a result of the first local binarization, then it is determined based on at least one of the average gray level ratio and the average gray level difference in the vicinal area whether or not the local binarization is to be performed again only on the pixels recognized as white pixels in the vicinal area of the target pixel.

Thus, although there is a thick character pattern near a thin ruled line, the ruled line portion can be prevented from being mis-recognized as white pixels and the pattern of the binarization result can be prevented from expanding. The obtained binary image may include a blur, but other ruled lines/character strokes are successfully binarized.

Furthermore, if there is a strong possibility that the target pixel forms part of a vertical or horizontal line, the binarization result of the target pixel can be recognized as black.

In this case, using the binarization threshold computed for the vicinal area, it is first determined whether each pixel in the vicinal area is white or black. Then, based on the result, a vertically-long area and a horizontally-long area having a predetermined width (for example, 1 dot width) and a target pixel in the center are set. If the vertically-long area or the horizontally-long area contains black pixels at or higher than a predetermined rate, then the target pixel is recognized possibly as part of a vertical line or a horizontal line, thereby recognizing the binarization result as black.

Thus, when there is a vertically-long pattern or a horizontally-long pattern containing the target pixel recognized as a white pixel, the target pixel can be correctly binarized by regarding the target pixel as a black pixel although a vertical or horizontal component indicates a blurry image.

In step S4 shown in FIG. 2, the ruled line extraction apparatus performs an all segment extracting process using the rather expanded binary image generated in step S2, and ruled line candidate areas are extracted. In this example, a line candidate area is extracted from a binary image using the segment extracting process described in the prior patent application 'Image Extraction System' (Japanese Patent Application Laid-open No. 6-309498).

In this segment extracting process, an adjacency projection value is computed for a binary image, and a line candidate area is detected by rectangle approximation. Adjacency projection refers to a projecting method in which the result obtained by adding the projection value of black pixels in a row or a column to the projection value of a row or a column in its vicinity is defined as the projection value of the row or the column. In this projecting method, the distribution of the black pixels around a specific row or column can be globally obtained. A similar process is performed both in the vertical and horizontal directions of a binary image.

A detection result of a ruled line candidate area can be represented by a set of one or more segment candidates. For example, in the detection result shown in FIG. 4, one ruled line candidate area is represented as a set of small segment candidate areas 31 32, and 33. By representing a ruled line candidate as a set of segments, a ruled line candidate can be extracted although an image is a little inclined. The position of the extracted candidate area is stored using horizontal coordinates (X coordinates) and vertical coordinates (Y coordinates), and is used as an area to be processed in the next segment verifying process.

Since the binary image to be processed is a rather expanded binary image without a blur in this example, a ruled line candidate area can be extracted only from the portion having high black pixel density. If an image is blurry, there is a possibility that a ruled line candidate area cannot be extracted. However, if an image is a rather expanded binary image, then there is a possibility that a character partly close to a ruled line, or a portion in which characters touch each other can be extracted as an excess candidate area, but the possibility that a ruled line cannot be extracted as a candidate are can be suppressed.

Thus, the position of a ruled line candidate can be successfully detected without the influence of a blur by extracting a ruled line candidate area using a rather expanded binary image without a blur.

Then, in step S7, the ruled line extraction apparatus performs a segment verifying process, and determines whether the segment candidates extracted in the all segment candidate extracting process in step S4 is a part of a ruled line, or others such as a character stroke, etc. In this process, a rather blurry binary image generated in step S5, an original gray scale image, and the coordinate information about a segment candidate area are used.

First, for each segment candidate area, the gray levels of the black pixels and white pixels contained in a rather blurry binary image are compared. If the difference is small, an intra-segment interpolating process to change the portion of the white pixels to black pixels is performed. Then, a segment determination is performed by defining a candidate area as a portion forming a ruled line if a black pixel rate is equal to or larger than a predetermined value for the candidate area as a result of the intra-segment interpolating process. A black pixel rate refers to the ratio of the number of black pixels to the number of pixels in a candidate area.

Thus, the blur of a ruled line is solved by determining whether or not an area extracted as a ruled line candidate is a ruled line using a rather blurry binary image and a gray scale image, thereby separating a ruled line portion from a character portion, and extracting only a ruled line portion.

FIG. 5 is a flowchart of the above mentioned segment verifying process. The ruled line extraction apparatus first refers to an area in a rather blurry binary image corresponding to each segment candidate, and checks the gray levels in the gray scale image of an area of black pixels (black pixel area) in the area (step S11). Furthermore, in the same segment candidate area, the gray levels in the gray scale image of an area of white pixels (white pixel area) is checked (step S12). Then, it is determined whether or not the difference between the average gray level of the black pixel area and the average gray level of the white pixel area is equal to or lower than a threshold (a predetermined value) (step S13).

If the average gray level difference exceeds the predetermined value, it is determined that the segment candidate area is not a segment (step S17), thereby terminating the process. Furthermore, if a average gray level difference is equal to or lower than the predetermined value, the white pixel area is regarded as a black pixel area, and it is determined whether or not the black pixel rate of the segment candidate area is equal to or larger than a predetermined value (step 15). A black pixel rate can be, for example, the ratio of the length of the black pixel area to the length of a segment candidate area.

If the black pixel rate is equal to or larger than the predetermined value, the segment candidate area is recognized as a segment (step S16). If the black pixel rate is smaller than the predetermined value, the segment candidate area is not recognized as a segment (step S17), thereby terminating the process.

Figure 6:
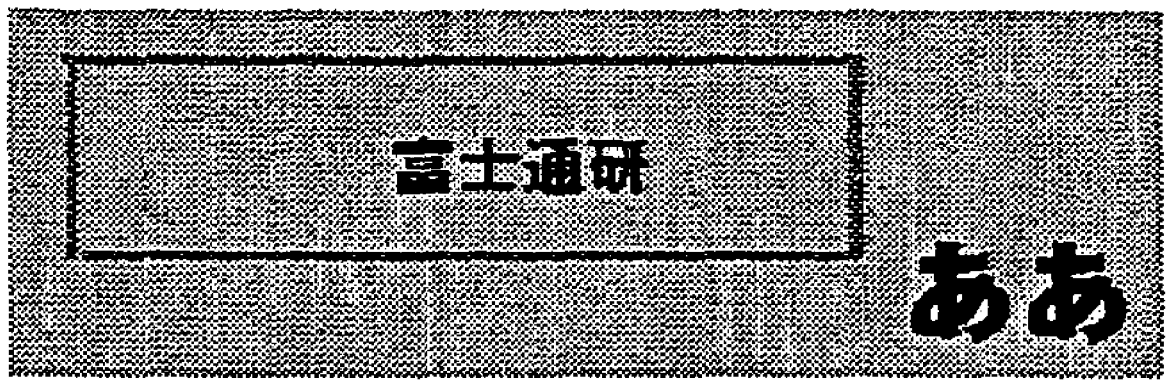
FIG. 6 shows a gray scale image.
Figure 7:
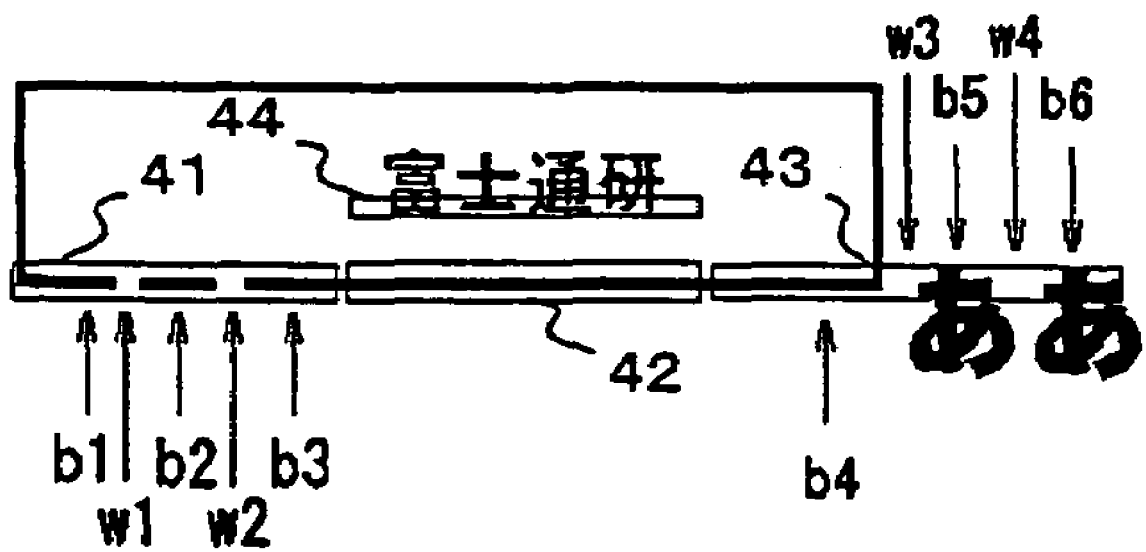
FIG. 7 shows a binary image and segment candidates.

For example, assume that a rather blurry binary image as shown in FIG. 7 has been obtained from a gray scale image as shown in FIG. 6, and areas 41, 42, 43, and 44 have been extracted as segment candidate areas having fixed lengths forming parts of horizontal ruled lines.

In FIG. 7, the areas b1, b2, and b3 indicate black pixel areas in the segment candidate area 41, and the areas w1 and w2 indicates white pixel areas in the segment candidate area 41. The areas b4, b5, and b6 indicate black pixel areas in the segment candidate area 43, and the areas w3 and w4 indicate white pixel areas in the segment candidate area 43.

Figure 8:
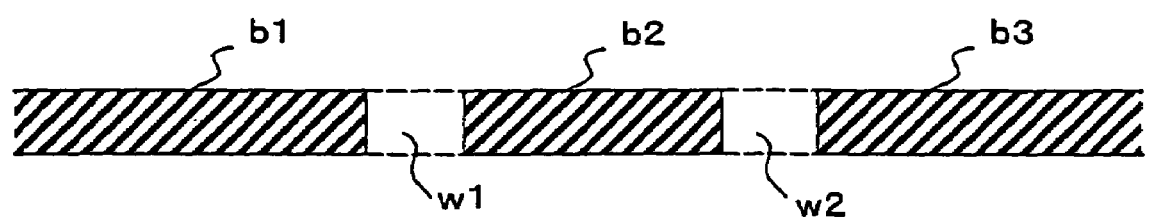
FIG. 8 shows black pixel areas and white pixel areas.

The scope of the black pixel areas b1, b2, and b3 are limited to the areas in which black pixels are distributed as shown in FIG. 8, and the scope of the white pixel areas w1 and w2 is limited to an area of the same width between two black pixel areas. This holds true with other black pixel areas and white pixel areas.

First, to determine whether or not the segment candidate area 41 is a ruled line, the gray levels of the pixels at the positions corresponding to the areas b1, b2, b3, w1, and w2 are checked, and the average gray level of the pixels forming respective areas is obtained. Since the areas w1 and w2 are portions forming part of a ruled line, their gray levels are similar to the gray levels of the areas b1, b2, and b3, and the pixels of the areas w1 and w2 are changed into black pixels. Therefore, the ratio of the length of the black pixel area to the length of the segment candidate area 41 becomes 100%, thereby determining the area 41 as a segment.

Furthermore, the black pixel areas in the area 44 is a part of a character, and the white pixel areas are the background. Therefore, the average gray level difference between a black pixel area and a white pixel area is large, and the pixels of the white pixel area are determined as white pixels as is. Therefore, the ratio of the length of the black pixel area to the length of the area 44 is smaller than a predetermined value, and it is determined that the area 44 is not a segment. The area 42 has no white pixel areas, and is therefore determined as a segment.

In the area 43, the black pixel areas b5 and b6 are part of characters, and the white pixel areas w3 and w4 are part of the background. Therefore, as in the case of the area 44, the average gray level difference between a black pixel area and a white pixel area is large, and the ratio of the length of the black pixel area to the length of the area 43 is smaller than a predetermined value, thereby determining that the area 43 is not a segment.

However, since the area 43 partly contains a ruled line, the actual ruled line area includes the areas 41, 42, and a part of the area 43. Therefore, to correctly extract the ruled line area, an end segment extracting process described later is performed. A segment verifying process similar to that performed on a horizontal ruled line is also performed on a vertical ruled line.

Thus, when the difference of the gray level is small between a black pixel area and a white pixel area in a segment candidate area, the pixel of the white pixel area is recognized as a black pixel, thereby solving the problem of the blur of a ruled line, and separating a ruled line portion from a character portion. In addition, a ruled line area having high black pixel density can be extracted by determining a segment candidate area having a black pixel rate equal to or larger than a predetermined value as a segment.

Then, in step S8 shown in FIG. 2, the ruled line extraction apparatus performs a segment integrating process, integrates a plurality of segment candidate areas determined to be segments, and generates a line area. Furthermore, in step S9 shown in FIG. 2, the end segment extracting process is performed in both ends of each line area after the integration, thereby correctly detecting the end of ruled line.

In the end segment extracting process, as in the segment verifying process, the rather blurry binary image generated in step S5 and the original gray scale image are used, and also the coordinate information about the integrated segment candidate area is used. First, the gray level of the black pixel area is compared with the gray level of the white pixel area at the end portion of a line area. If the difference is small, white pixels are regarded as black pixels, and the intra-segment interpolation is performed. The area in which the ratio of the black pixel is equal to or larger than a predetermined value is added to the line area as an end segment of a ruled line.

Figure 9:
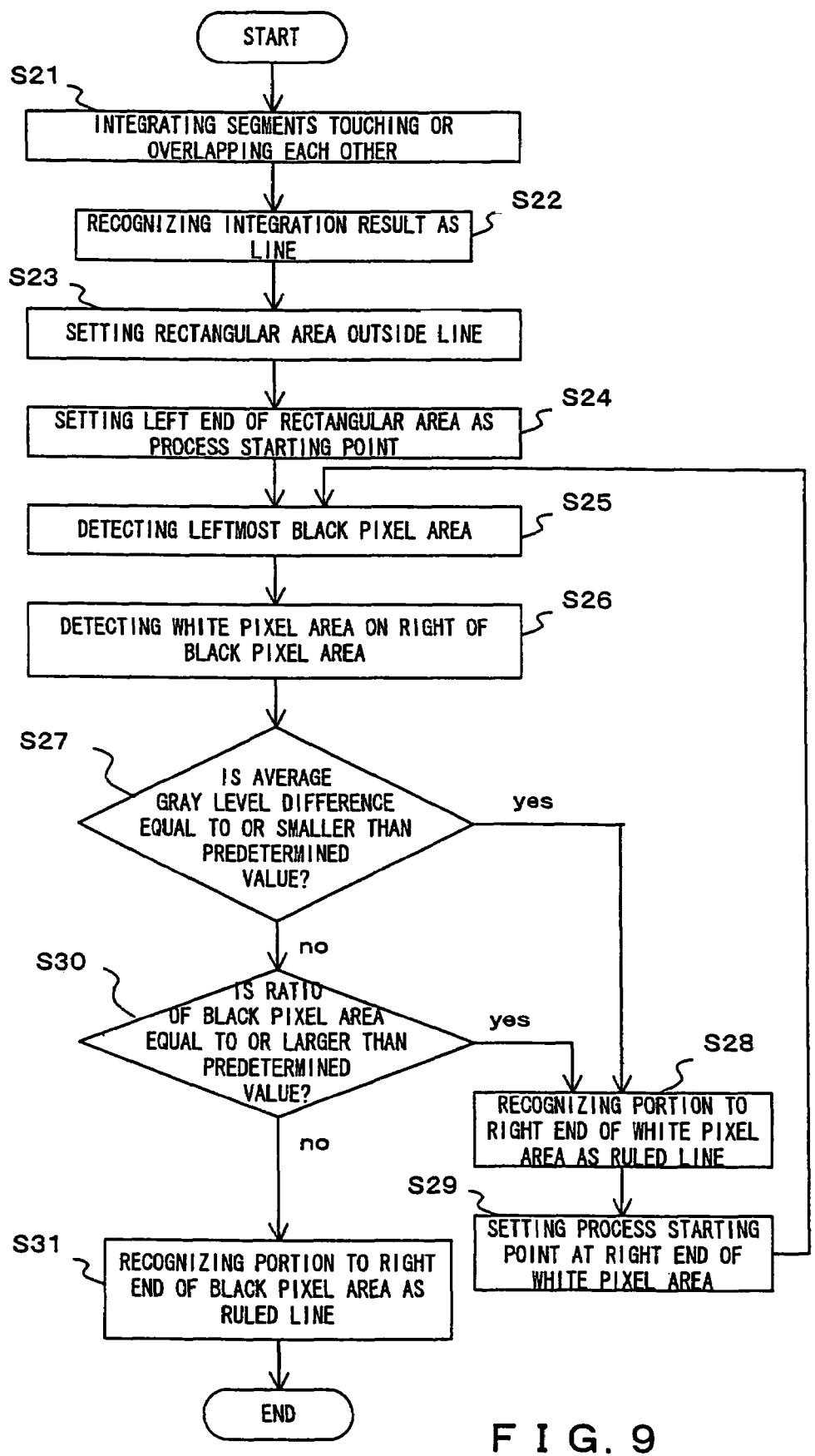
FIG. 9 is a flowchart of the first segment integrating process and the end segment extracting process.

FIG. 9 is a flowchart of the segment integrating process and the segment extracting process. In this example, an end segment on the right end is extracted, but the similar process is performed on the left end.

The ruled line extraction apparatus first integrates touching or overlapping areas in segment candidate areas each of which has been determined to be a segment (step S21), and the integration result is regarded as a line (step S22). For example, in the case shown in FIG. 7, the areas 41 and 42 are integrated into a line.

Then, a rectangular area having a constant length and the width of the straight line from the right end of each line area toward outside is set, and the area is defined as a process scope (step S23). Then, the left end of the process scope is set as a process starting point (step S24). Afterward, the process is performed from left to right.

Then, the black pixel area at the leftmost position on the right side of the process starting point is detected from the rather blurry binary image (step S25), and the adjacent white pixel area to the right of the black pixel area is detected (step S26). Then, the gray levels in the gray scale image of the black pixel area and the white pixel area are checked, and it is determined whether or not the average gray level difference between the black pixel area and the white pixel area is equal to or smaller than a threshold (predetermined value) (step S27).

If the average gray level difference is equal to or smaller than the predetermined value, the white pixel area is regarded as a black pixel area, and it is determined that the portion from the process starting point to the right end of the white pixel area forms part of a ruled line (step S28). Then, the right end of the white pixel area is defined as a new process starting point (step S29), and the processes in and after step S25 are repeated.

In step S27, if the average gray level difference exceeds the predetermined value, then it is determined whether or not the ratio of the length of the black pixel area to the length from the left end of the process scope to the right end of the white pixel area is equal to or larger than a predetermined value (step S30). If the ratio is equal to or larger than the predetermined value, then the processes in and after step S28 are performed.

If the ratio of the length of the black pixel area is smaller than the predetermined value, then it is determined that the portion from the left end of the process scope to the right end of the black pixel area is a part of a ruled line (step S31). Then, the rectangular area containing the left end of the process scope to the right end of the black pixel area is set as an end segment, thereby terminating the process. A ruled line area is generated by integrating a line area with left and right end segment areas.

Assume that the areas 41 and 42 shown in FIG. 7 are integrated into a line. Since the black pixel area b4 on the right side of the line is linked to the black area of the segment candidate area 42, it is assumed to be a part of a ruled line. Then, the gray levels of the gray scale images corresponding to the black pixel area b4 and the white pixel area w3 are checked with the left end of the black pixel area b4 as a process starting point, and the average gray levels are compared with each other. However, since the black pixel area b4 is a part of a ruled line, and the white pixel area w3 is a background, the average gray level difference exceeds a predetermined value.

Therefore, the white pixel area w3 remains white pixels, and then the ratio of the length of the black pixel area b4 to the length of the portion from the left end of the black pixel area b4 to the right end of the white pixel area w3 is computed. The ratio is determined to be smaller than a predetermined, and the portion from the left end to the right end of the area b4 is extracted as an end segment.

If the average gray level difference between the areas b4 and w3 is equal to or smaller than a predetermined value, or the ratio of the length of the area b4 is equal to or larger than a predetermined value, then it is determined that the portion from the left end of the area b4 to the right end of the area w3 is a part of a ruled line. Then, the process continues with the right end of the area W3 as a process starting point. Then, an end of a ruled line is detected by repeating a similar process, and an area from the left end of the area b4 to the newly detected end of a ruled line is extracted as an end segment.

In the above mentioned process, it is permitted that the positions of the areas b4, b5, and b6 are a little shifted up or down the Y coordinate of the area 42 so that a small tilt of an image can be allowed. A process similar to the process performed on a horizontal segment candidate area is performed on a vertical segment candidate area.

In the ruled line extracting process shown in FIG. 2, a rather blurry binary image is generated for the entire gray scale image in advance. However, a similar process result can be obtained although a rather blurry binary image is generated with an area limited to the ruled line candidate area detected using a rather expanded binary image. Thus, the time required to perform a binarizing process can be shortened by performing the binarizing process on an area in the gray scale image corresponding to a ruled line candidate area and by partially generating a rather blurry binary image.

When an end segment is extracted, the ruled line extraction apparatus generates a ruled line image from the information about each area determined to be a ruled line. Practically, black pixels in each ruled line area, and pixels recognized as a black pixel by the intra-segment interpolation in the segment verifying process and the end segment extracting process are extracted, and a new binary image having the extracted pixels newly defined as black pixels. Thus, a ruled line image obtained by selectively binarizing only ruled line portions in a gray scale image can be obtained. When the conventional ruled line extracting process is performed only on a binary image, the ruled line image can be used.

However, since the ruled line image is obtained by selecting only the line portions, the other portions are white pixels. Therefore, when a process is performed on a pattern having a round corner frequently appearing in common slips, etc., an obtained ruled line image indicates a blank portion for the round corner, and vertical and horizontal ruled lines to be connected by the round corner appear separate from each other. Therefore, in step S10 shown in FIG. 2, the ruled line extraction apparatus extracts a round corner, and correctly restores a ruled line structure.

Figure 11:
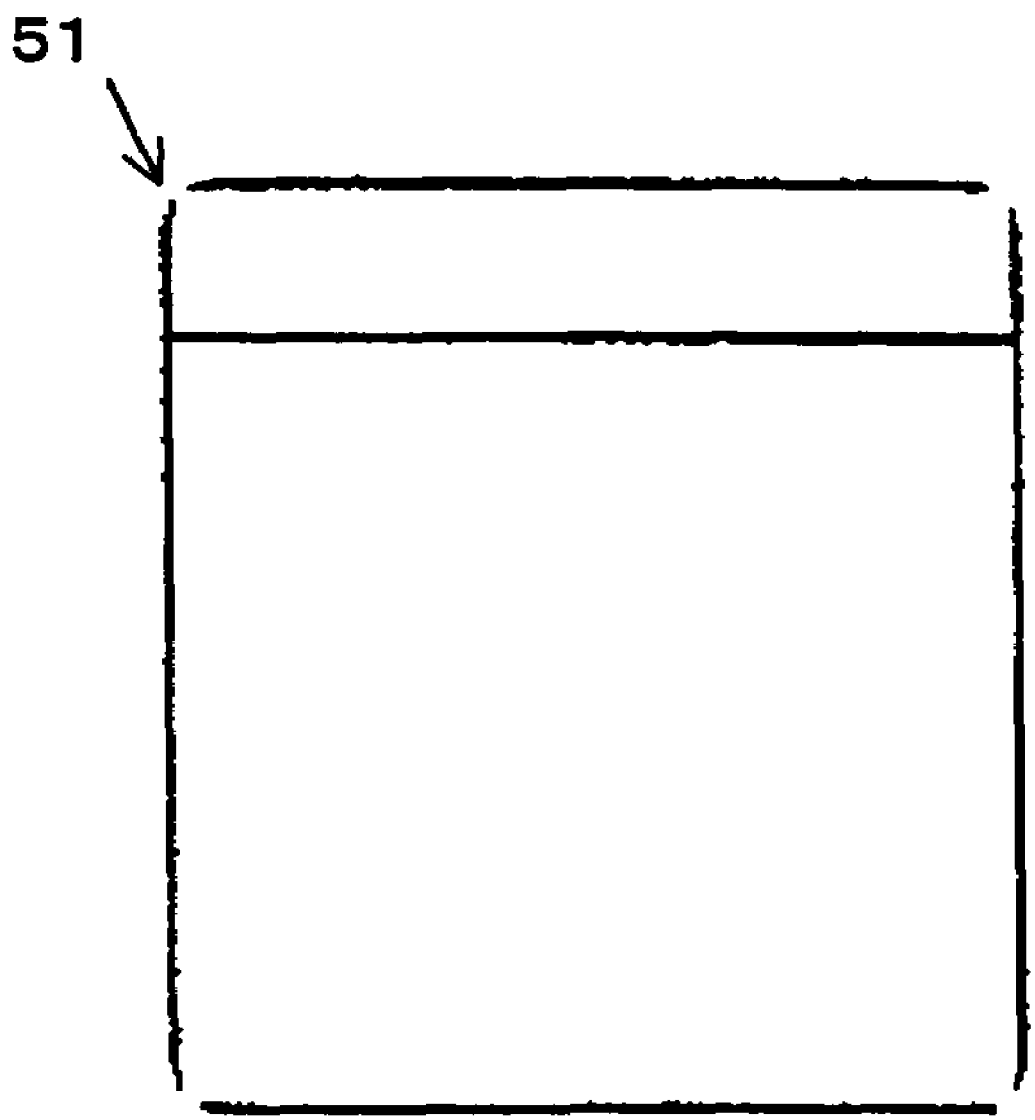
FIG. 11 shows a first ruled line image.
Figure 12:
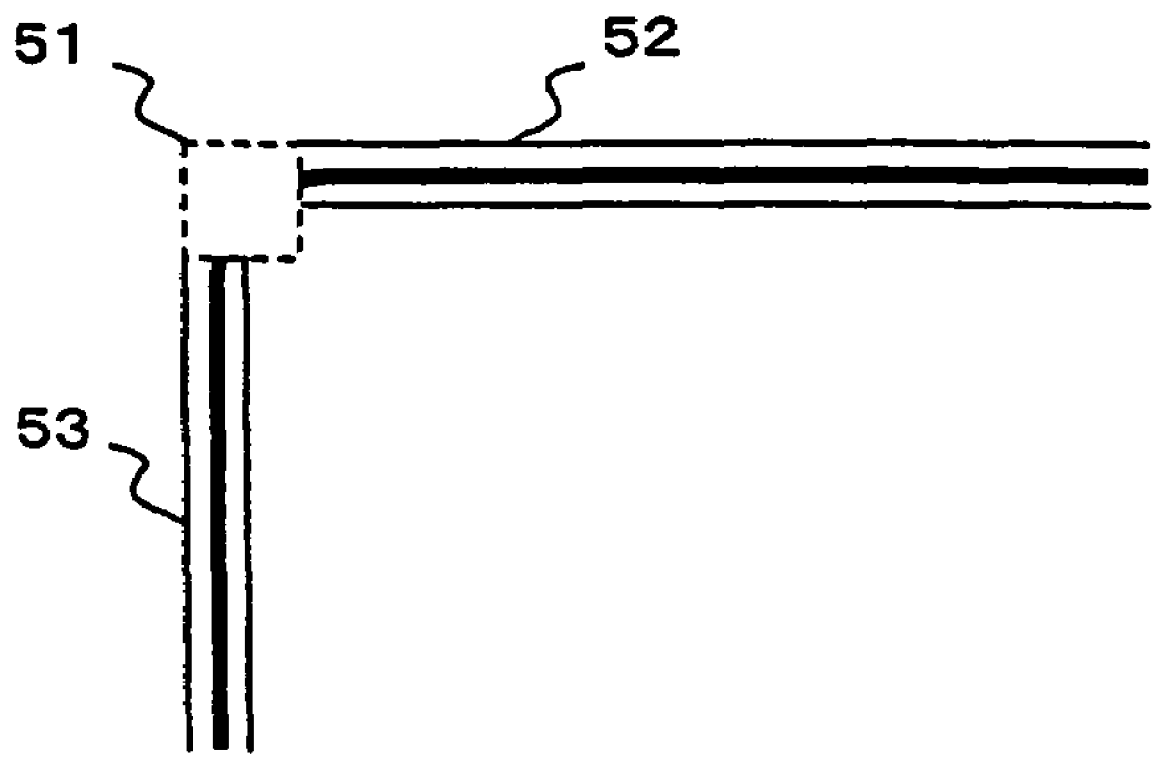
FIG. 12 shows a round corner.

For example, a ruled line image as shown in FIG. 11 is generated from a gray scale image of a table having round corners as shown in FIG. 10. An area 51 shown in FIG. 11 corresponds to the upper left round corner of the table shown in FIG. 10, and is positioned between an area 52 determined to be a horizontal ruled line portion and an area 53 determined to be a vertical ruled line portion as shown in FIG. 12. Therefore, the area 51 is not recognized as a ruled line in this situation.

Then, the distances between the end points of the ruled line areas 52 and 53 are computed in both vertical and horizontal directions. If the values are equal to or smaller than a predetermined value, then it is assumed that there is a strong possibility that a round corner exists in the area 51 between the areas 52 and 53. Then, the above mentioned rather blurry binary image is partially generated for the area 51. If a pattern equal to or larger than a predetermined size is obtained, it is extracted as a round corner pattern.

Figure 13:
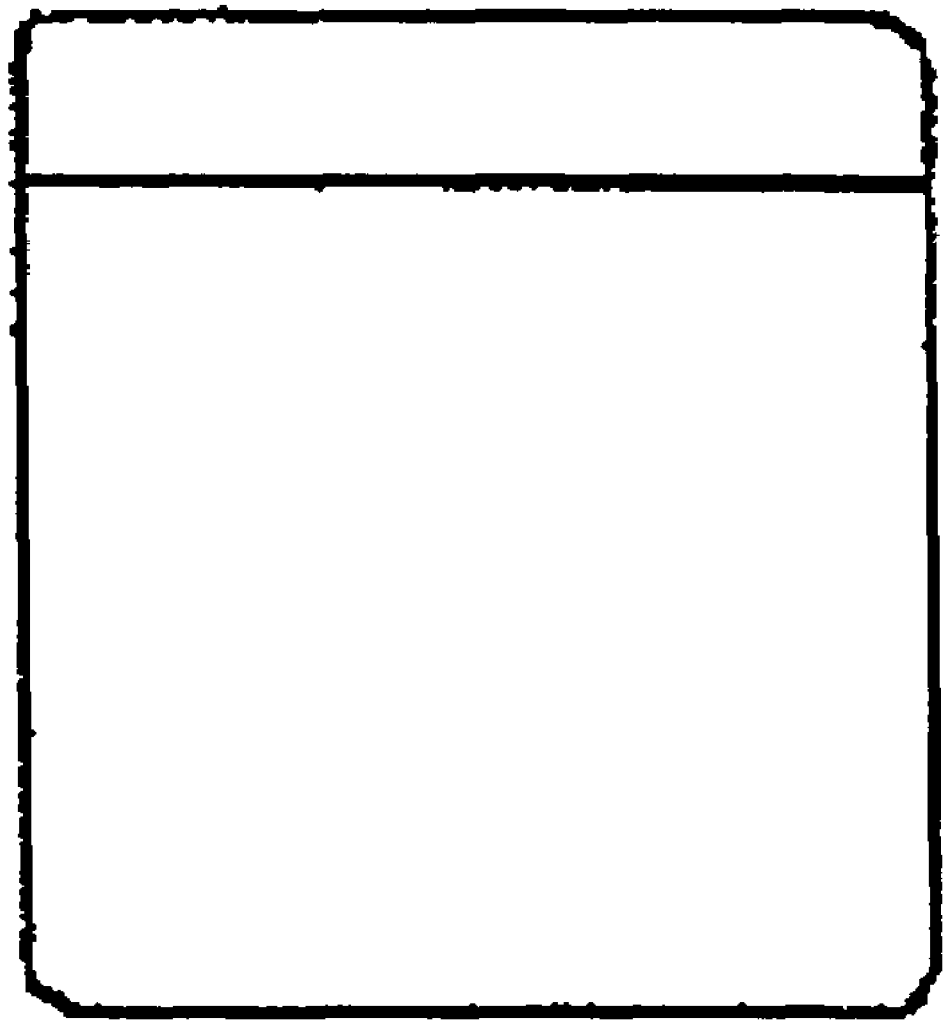
FIG. 13 shows a second ruled line image.

By adding extracted patterns to a ruled line image, a ruled line image containing round corners can be generated as shown in FIG. 13. Here, the process of extracting a round corner pattern is described, but any shape of corner pattern can be extracted in a similar process.

Thus, when the distance between a vertical ruled line area and a horizontal ruled line area is equal to or smaller than a predetermined value, the area of the gray scale image corresponding to the area between the vertical and horizontal ruled lines is detected, and the binarizing process is performed on the area to obtain a binarized pattern of the corner portion. Only when the size of the obtained binarized pattern is equal to or larger than a predetermined value, it is extracted as a pattern of the corner portion, thereby removing noise from the ruled line image.

In the end segment extracting process in step S9 shown in FIG. 2, whether a ruled line candidate is a ruled line is determined only based on the gray level change in the area of the ruled line candidate and the area obtained by extending the ruled line candidate at a ruled line determination. Thus, when there is a line as shown in FIG. 7, the line portion and the character portion can be separated from each other.

Figure 14:
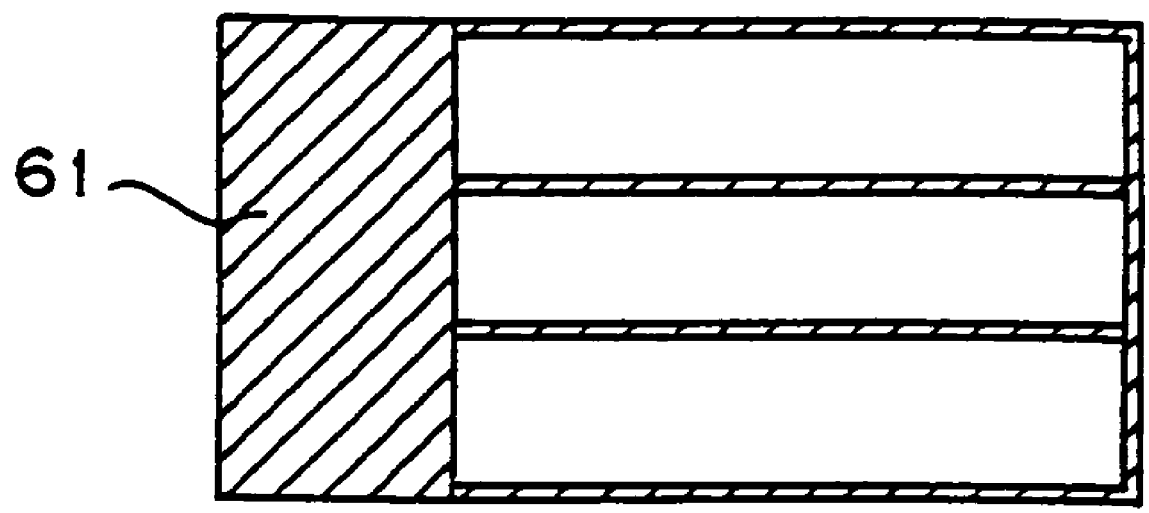
FIG. 14 shows a gray scale image containing a shadowed cell.
Figure 15:
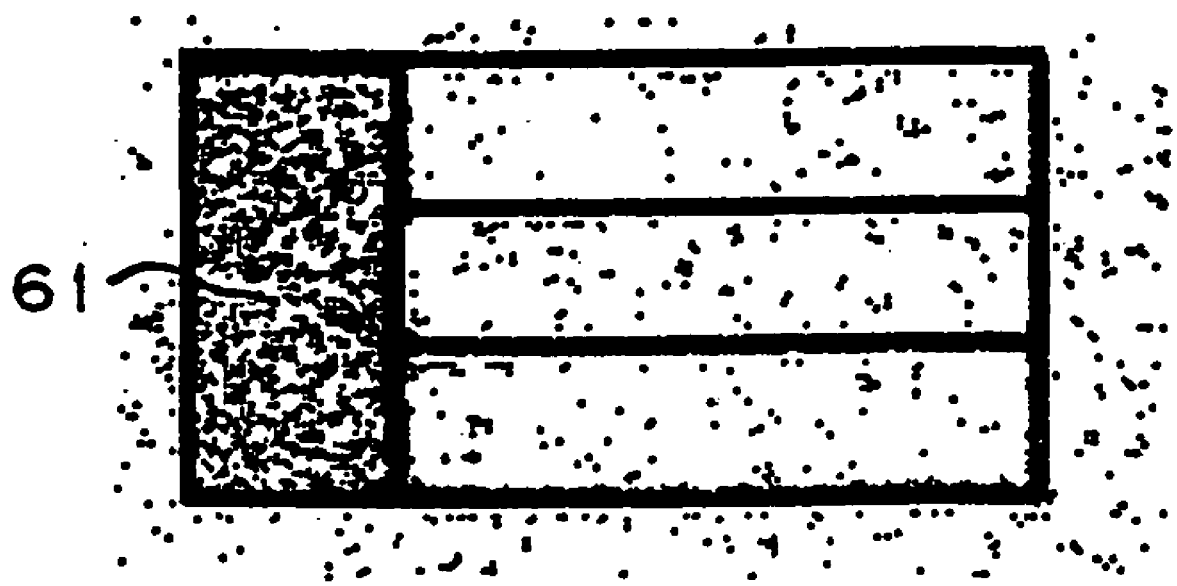
FIG. 15 shows a rather expanded binary image.
Figure 16:
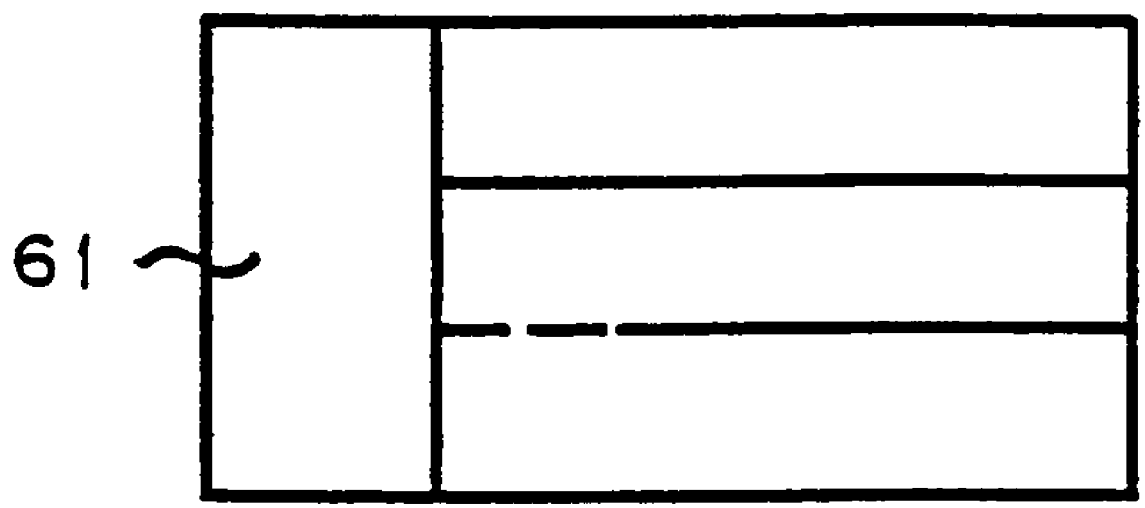
FIG. 16 shows a rather blurry binary image.
Figure 17:
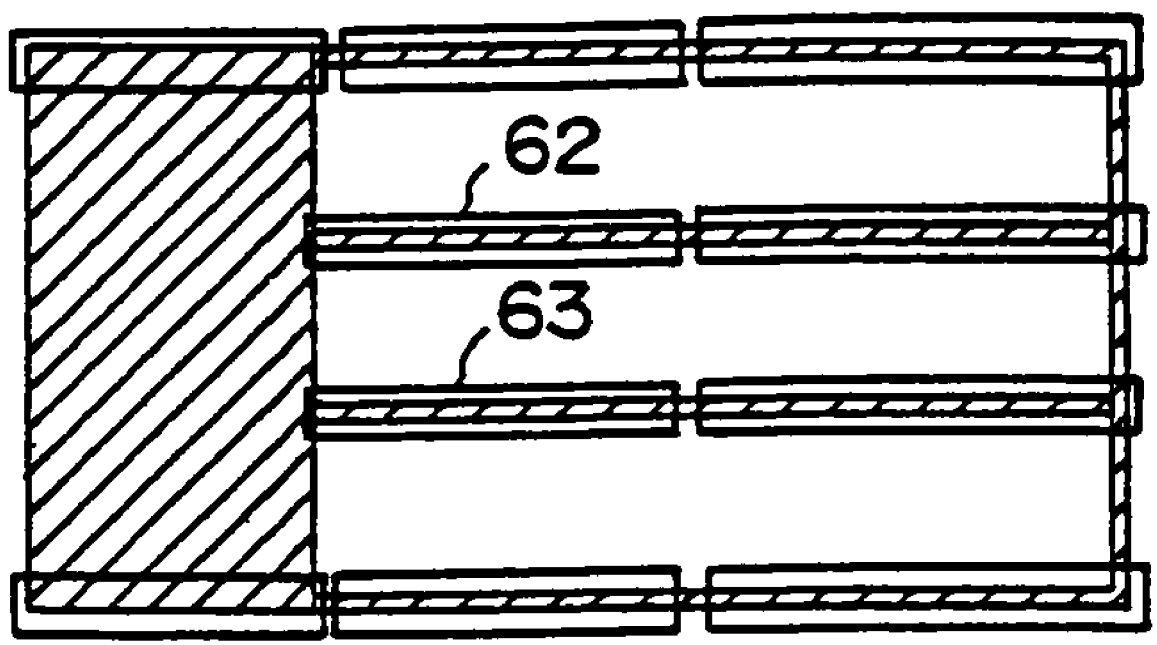
FIG. 17 shows second segment candidates.

However, for an image containing a shadowed cell as shown in FIG. 14, the length of the ruled line area is not correct, and a ruled line can be mistakenly extracted. In the gray scale image shown in FIG. 14, a cell 61 is shadowed. Assume that a rather expanded binary image as shown in FIG. 15, a rather blurry binary image as shown in FIG. 16, and segment candidate areas as shown in FIG. 17 have been obtained. At this time, in the binary image shown in FIG. 16, the inside of the cell 61 is a white pixel area and has no ruled lines.

Nevertheless, if the gray level difference between the ruled line portion and the cell 61 is small, the cell 61 is recognized as a black pixel area if the end segment extracting process is performed on the left end portion of segment candidate areas 62 and 63, thereby excessively extending the end segments.

To avoid excess extension of a segment, the information about a rather expanded binary image whose pattern is totally binarized including noise is used.

In the rather expanded binary image shown in FIG. 15, the density of black pixels is high around the ruled line portion and the cell 61. Since the rather expanded binary image is generated by the local binarization, the inside of the cell 61 is processed as a dark background portion and tends to contain larger noise than a white area. However, it basically has the same feature as the background portion.

Then, in the rather expanded binary image, the area having relatively high density of black pixels is processed as an area in which there is the possibility that a ruled line exists. In this case, in the process of determining whether or not the portion around an area extracted as a ruled line candidate is actually a ruled line, only a portion in which the density of black pixels of the rather expanded binary image is equal to or larger than a predetermined value is to be determined. A ruled line can be prevented from being extended to inside the cell by setting a threshold of the density of black pixels such that the area in the shadowed cell can be removed from the areas to be determined.

Figure 18:
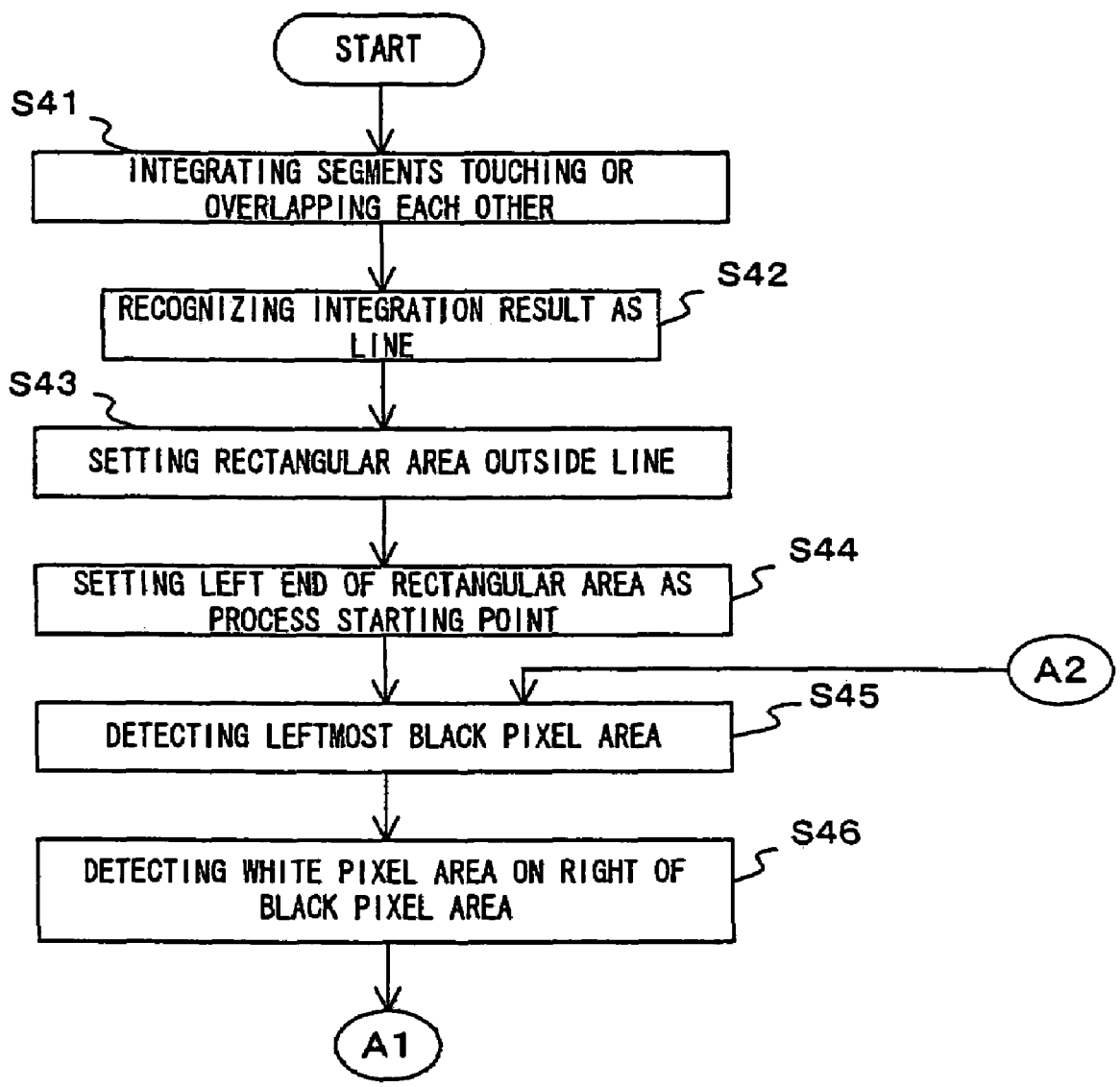
FIG. 18 is a flowchart (1) of the second segment integrating process and end segment extracting process.
Figure 19:
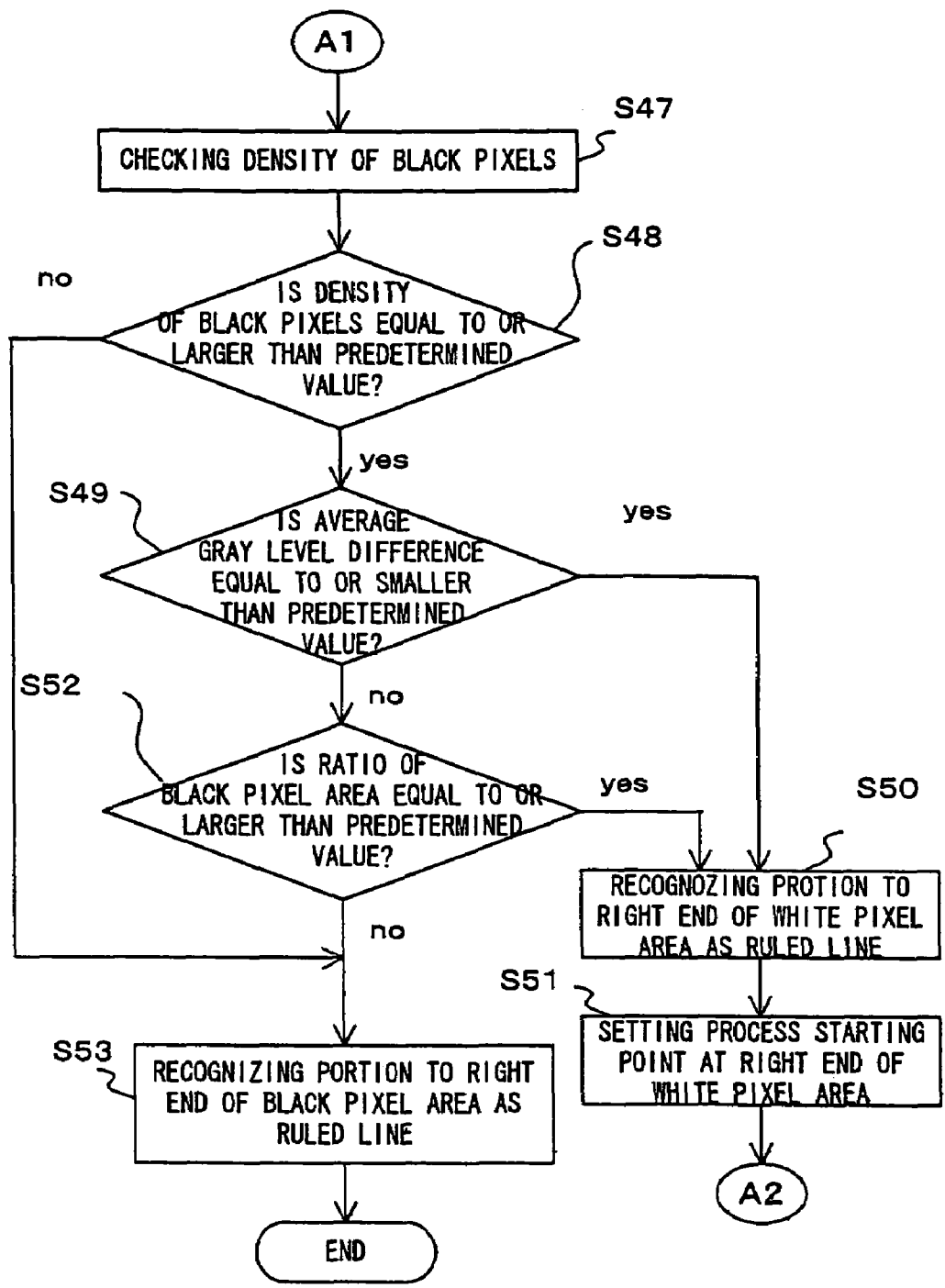
FIG. 19 is a flowchart (2) of the second segment integrating process and end segment extracting process.

When the above mentioned end segment extracting process is performed, the flowchart shown in FIG. 9 is changed into the flowcharts shown in FIGS. 18 and 19. The processes in steps S41 through S46 shown in FIG. 18 are the same as the processes in steps S21 through S26 shown in FIG. 9. The processes in steps S49 through S53 shown in FIG. 19 are the same as the processes in steps S27 through S31 shown in FIG. 9.

When the adjacent white pixel area to the right of the black pixel area is detected in step S46 shown in FIG. 18, then the ruled line extraction apparatus refers to a corresponding area in the rather expanded binary image to the area emcompassing the detected black pixel area and white pixel area, and checks the density of black pixels of the area (step S47 in FIG. 19). Then, it is determined whether or not the obtained density of black pixels is equal to or larger than a predetermined value (step S48).

If the density of black pixels is equal to or larger than the predetermined value, then there is the possibility that the white pixel area is a ruled line. Therefore, the processes in and after step S49 are performed on the black pixel area and white pixel area. If the density of black pixels is smaller than the predetermined value, the white pixel area is assumed to be an area other than a ruled line, and the process in step S53 is performed.

Thus, in the process shown in FIG. 19, the area having a rather expanded binary image whose density of black pixels is smaller than a predetermined value is removed from the areas to be determined in step S49. However, the determination in step S49 can also be performed on such an area. In this case, when an area having the density of black pixels equal to or larger than a predetermined value is to be processed, the threshold of an allowable gray level difference is loosened (set larger). When an area having the density of black pixels smaller than a predetermined value is to be processed, the threshold is tightened (set smaller). Thus, as in the process shown in FIG. 19, the excess extension of a ruled line can be avoided.

Similarly, in the segment verifying process, the density of black pixels is checked in a rather expanded binary image, and then the threshold in step S13 can be changed based on the obtained value. Thus, the possibility that a ruled line is excessively extended can be further reduced.

A ruled line written on the reverse side of paper of a slip etc. and a ruled line written on the next page in a brochure can slightly be seen through paper. In this case, an input image can also show the ruled line on the reverse side seen through the paper. Such a ruled line is hereinafter referred to as a reverse-side ruled line.

Figure 20:
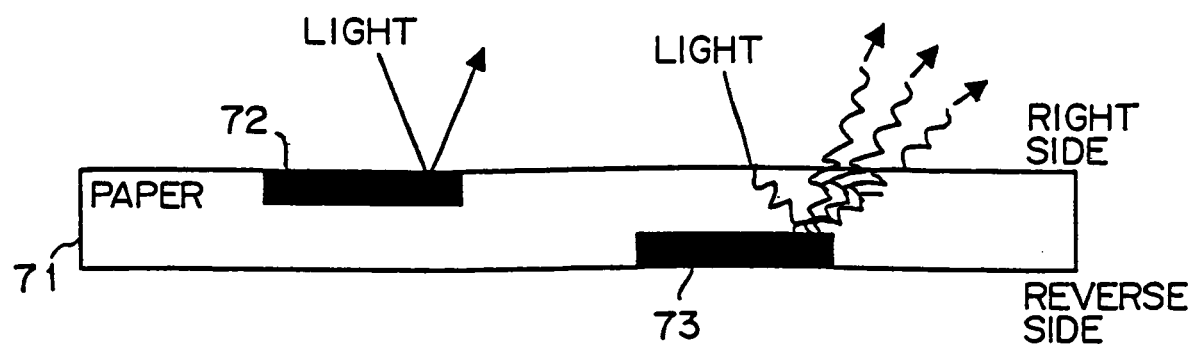
FIG. 20 shows a right-side ruled line and a reverse-side ruled line.

FIG. 20 shows an example of a ruled line printed on the right side and a reverse-side ruled line. The pattern of a right-side ruled line is generated by the light reflected by a ruled line 72 printed on the right side of a sheet of paper 71, but the pattern of a reverse-side ruled line is generated by the light reflected and diffused by the fiber of the paper 71 when the light is reflected by a ruled line 73 printed on the reverse side and passes through the paper 71. Therefore, the pattern of a reverse-side ruled line has a blurry and blotting contour, and has low linearity of the ruled line as compared with the pattern of a right-side ruled line.

On the other hand, in the ruled line extracting process shown in FIG. 2, the extraction precision is improved, and not only a thick ruled line contained in an input image, but also a thin ruled line can be extracted. Therefore, if the information written on the paper is input as a gray scale image, then a reverse-side ruled line can be extracted when a ruled line written on the reverse side or next page is seen through the paper. When both thick and thin ruled lines are extracted, it is necessary to determine whether the extracted ruled line is written on the right side or the reverse side.

The feature of the above mentioned reverse-side ruled line can be used in the determination. That is, according to the information about a change of the gray level of the contour portion of an extracted ruled line area, it is determined that the ruled line is a right-side ruled line if the change of the gray level is large, and that it is a reverse-side ruled line if the change of the gray level is small. Although the right-side ruled line and the reverse-side ruled line have almost the same gray level, there can be a difference between the two in the change of the gray level of the contour portion and the determination is possible.

A blurry contour of a reverse-side ruled line indicates that there is a small change of the gray level from the contour of the pattern of the ruled line toward the inside of the pattern. On the other hand, a clear contour indicates that there is a large change of the gray level from the contour toward the inside of the pattern.

Considering the change of the gray level in the direction vertical to the contour line of the ruled line (in the direction vertical to the ruled line), a reverse-side ruled line indicates a small change of the gray level while a right-side ruled line indicates a large change of the gray level. Furthermore, since the reverse-side ruled line has a blotting contour, the change of the gray level in the direction along the contour line of the ruled line (in the direction along the ruled line) of the reverse-side ruled line is larger than that of the right-side ruled line.

In addition, a clear contour of a right-side ruled line is assumed to be obtained independent of the gray level of a ruled line, and a blur contour of a reverse-side ruled line is also assumed to be obtained independent of the gray level. Therefore, in the determining method based on the clearness of the contour of a ruled line, a ruled line can be correctly determined when the gray level of a right-side ruled line is thin, and when the gray level of a reverse-side ruled line is thick.

In this example, a change of the gray level of a contour is evaluated with a ruled line area extracted in the end segment extracting process specified as a ruled line candidate area using [the change of the gray level in the direction vertical to the ruled line/the change of the gray level in the direction parallel to the ruled line] as an evaluation value for the contour portion of the pattern contained in the ruled line candidate area. The evaluation value is larger for the right-side ruled line and is smaller for the reverse-side ruled line.

Figure 21:
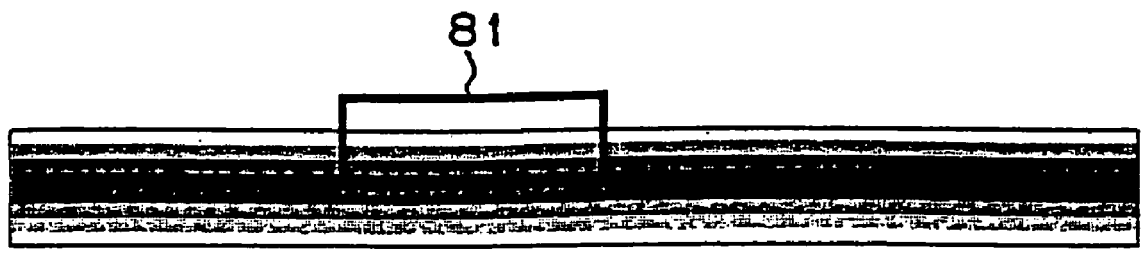
FIG. 21 shows the contour portion of a ruled line.
Figure 22:
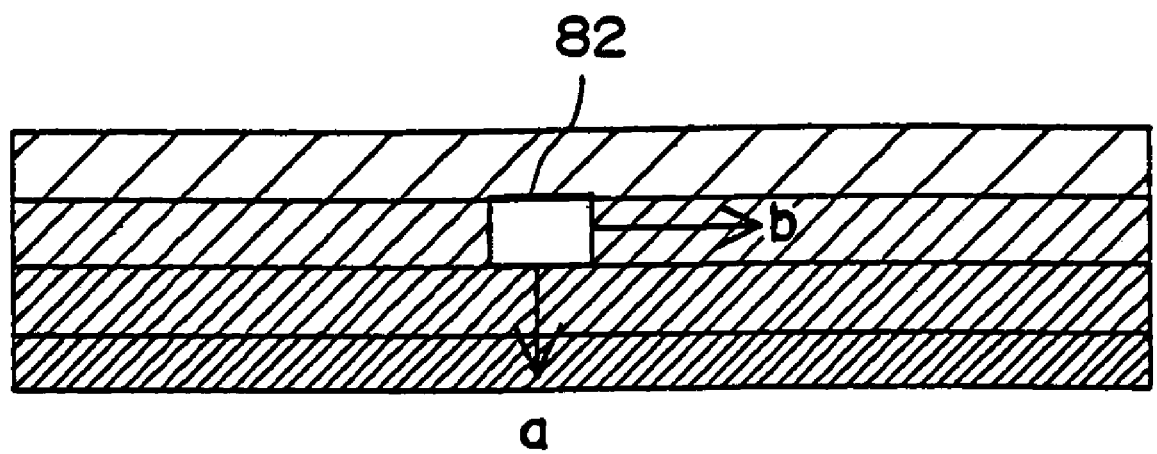
FIG. 22 shows the vertical and horizontal directions of the contour.

FIG. 21 shows the contour portion of a line pattern of a ruled line candidate. FIG. 22 is an enlarged view of an area 81 shown in FIG. 21. It shows that the gray levels of pixels are gradually becoming higher from the contour to the inside of the pattern. In FIG. 22, two directions are defined for a pixel 82. The vertical direction a corresponds to the direction vertical to the ruled line, and the horizontal direction b corresponds to the direction parallel to the ruled line.

Thus, using the change of the gray level in the direction vertical to a ruled line and the change of the gray level in the direction horizontal to a ruled line, it is determined whether the pattern of a ruled line candidate is a right-side ruled line or a reverse-side ruled line, whereby extracting only the necessary image information.

FIG. 23 is a flowchart of the ruled line extracting process of such reverse-side determination. The processes in steps S61 through S69 shown in FIG. 23 are the same as the processes in steps S1 through S9 shown in FIG. 2. The process in step S72 shown in FIG. 23 is the same as the process in step S10 shown in FIG. 2.

When ruled line areas are determined in step S69 shown in 23, the ruled line extraction apparatus defines the areas as new ruled line candidate areas, divides a ruled line candidate area at the intersection of the vertical and horizontal ruled line candidate areas, and generates a target area for the reverse-side determination (step S70).

In this process, the unit of an area to be determined is set based on the intersections of ruled lines. Since the type of a ruled line does not change on the side forming part of a cell, the type of a line is determined in cell side units. That is, if a ruled line is selected, and another ruled line crosses it vertically to the ruled line, then the intersection of the two ruled lines is assumed to be a candidate point at which the type of line changes, and the area between two intersections is defined as an area to be determined.

Figure 24:
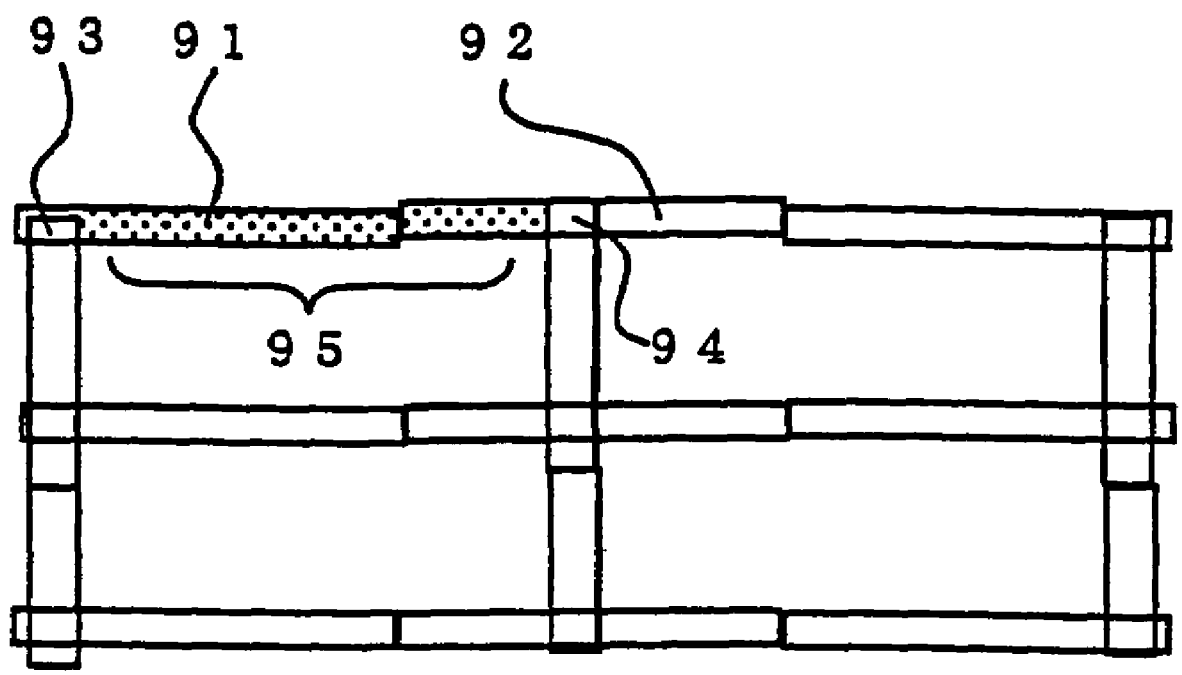
FIG. 24 shows a ruled line candidate area.

For example, when ruled line candidate areas (rectangles) as shown in FIG. 24 are extracted, a ruled line candidate area 91 is not divided, and a ruled line candidate area 92 is divided into two areas at an intersection 94. Then, an area 95 between intersections 93 and 94 is an area to be determined. A similar dividing process is performed on other ruled line candidate areas.

Then, the ruled line extraction apparatus performs the reverse-side determination for each area to be determined (step S71). As a result, it is assumed that the area determined to be a reverse-side ruled line is not a ruled line, and is removed from the ruled line candidates. Then, only the areas determined to be right-side ruled lines remain as ruled line areas, and the process in step S72 is performed. In step S71, the reverse-side determination is performed in the following procedure.

(1) The changes of the gray levels in the direction horizontal to the ruled line and in the direction vertical to the ruled line are computed for each pixel of the contour portion of an area to be determined.

In this process, a target pixel is selected, and a pixel adjacent to or a pixel some dots apart from the target pixel in the direction parallel to the ruled line is selected as a compared pixel. Then, the gray level difference between the target pixel and the compared pixel is computed. The obtained value is defined as an amount of a gray level change in the direction parallel to the ruled line for the target pixel. Similarly, in the direction vertical to the ruled line, a target pixel is selected, and a pixel adjacent to or a pixel some dots apart from the target pixel is selected as a compared pixel. The gray level difference between the target pixel and the compared pixel is defined as an amount of a gray level change in the direction vertical to the ruled line for the target pixel.

Figure 25:
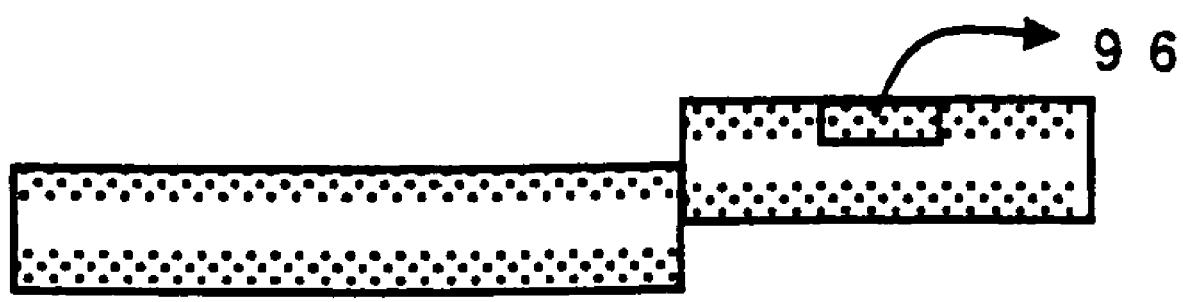
FIG. 25 shows an area to be determined.
Figure 26:
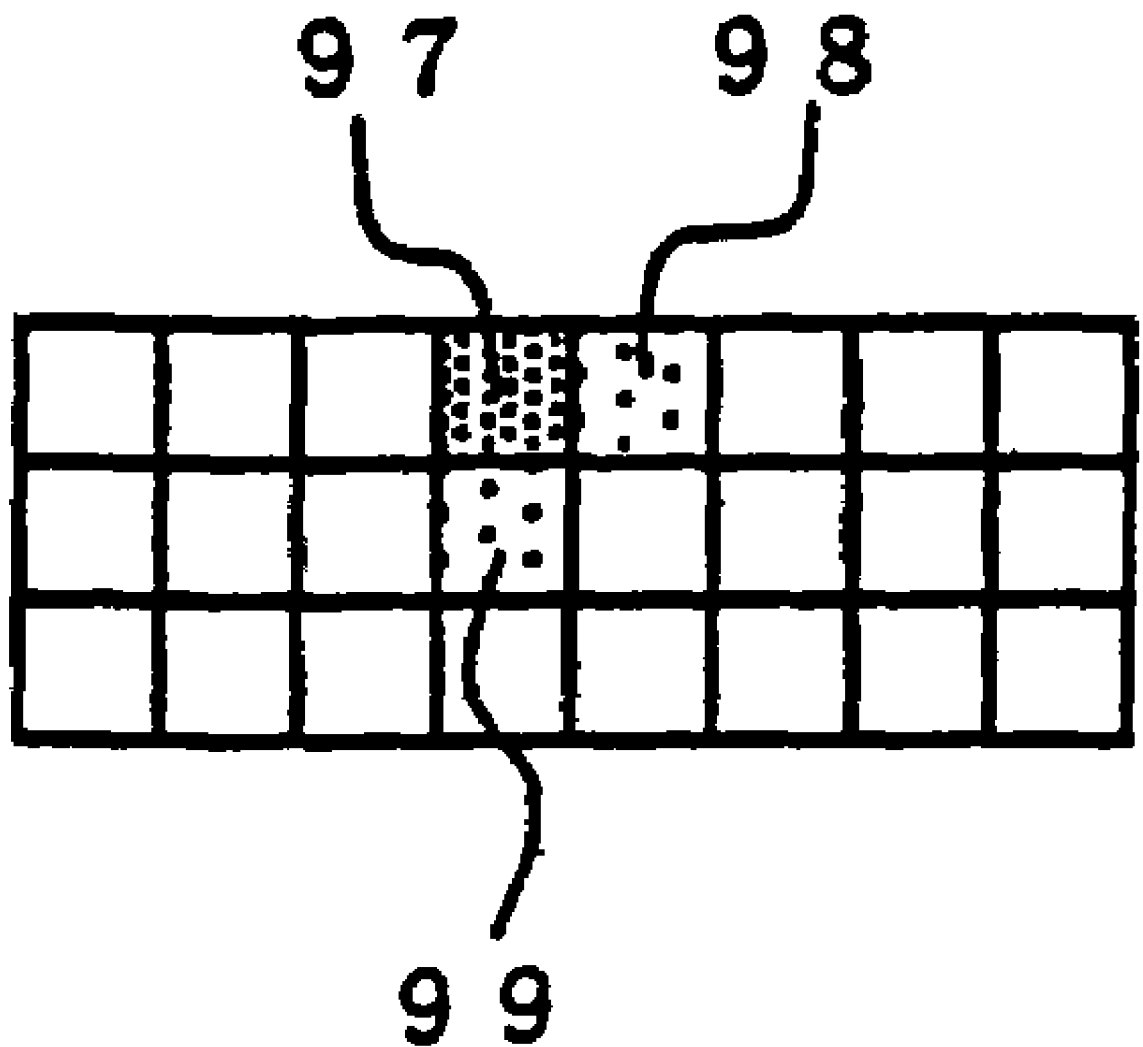
FIG. 26 shows a target pixel and a compared pixel.

For example, in the case of the area to be determined 95 shown in FIG. 24, dotted areas shown in FIG. 25 are assumed to be a contour portion, and the amount of a gray level change is computed for the pixels contained in the areas. FIG. 26 shows an enlarged view of an area 96 forming part of the contour portion. FIG. 26 shows an area of 3 dots×8 dots, and a target pixel 97. When pixels 98 and 99 are selected as compared pixels, the gray level difference between the pixels 97 and 98 is an amount of a gray level change in the direction parallel to the ruled line for the pixel 97, and the gray level difference between the pixels 97 and 99 is an amount of a gray level change in the direction vertical to the ruled line for the pixel 97.

(2) The value of [the change of the gray level in the direction vertical to the ruled line/the change of the gray level in the direction parallel to the ruled line] is computed for each pixel.

(3) An average value of the values computed for all pixels of the contour portion in an area to be determined is obtained, and the obtained value is defined as an evaluation value of the area to be determined.

(4) It is determined that an area to be determined having an evaluation value equal to or larger than a predetermined value is an area of a right-side ruled line, and it is determined that an area to be determined having an evaluation value smaller than the predetermined value is an area of a reverse-side ruled line. Then, areas of the reverse-side ruled line are removed from the ruled line areas, and areas of the right-side ruled line are output as ruled line areas.

Thus, a change of the gray level in the direction vertical to a ruled line and a change of the gray level in the direction parallel to the ruled line are computed for each of the areas to be determined and extracted from a gray scale image, and the reverse-side determination is performed based on the value of [the change of the gray level in the direction vertical to a ruled line/the change of the gray level in the direction parallel to a ruled line], thereby correctly extracting ruled line information.

In the above mentioned procedure, an evaluation value is computed based on both change of the gray level in the direction vertical to a ruled line, and change of the gray level in the direction parallel to a ruled line. In addition, effective reverse-side determination can also be performed using a change of the gray level in the direction vertical to a ruled line as an evaluation value. In this case, if the evaluation value is equal to or larger than a predetermined value on at least a part of pixels of a contour portion, then it is determined that the area to be determined is an area of a right-side ruled line, and that other areas to be determined is areas of reverse-side ruled lines.

Instead of performing the reverse-side determination using a predetermined threshold, a histogram, etc. indicating the distribution of the evaluation values of all areas to be determined can be generated, a threshold of the evaluation value with which the areas to be determined can be divided into two groups can be obtained each time, and the determination can be performed based on the obtained threshold.

In this case, for example, the distribution of an evaluation value can be divided into two by applying the threshold selection method by Otsu (Otsu, 'An Automatic Threshold Selection Method Based on Discriminant and Least Squares Criteria', the Theses of the Institute of Electronics and Communication Engineers, '80/4 Vol. J63-D No. 4, pp. 349-356, 1980). In this method, the optimum threshold can be obtained based on the inter-class dispersion or the dispersion rate (=intra-class dispersion/inter-class dispersion), and the given distribution is divided into two groups.

Then, the ruled line extraction apparatus determines that the area to be determined which belongs to a group of larger evaluation values is an area of a right-side ruled line, and that the area to be determined which belongs to a group of smaller evaluation values is an area of a reverse-side ruled line.

In the ruled line extracting process shown in FIG. 23, the reverse-side determination is performed after extracting a ruled line area from a gray scale image in the procedure of the process shown in FIG. 2, but the determination in step S71 can be applied to a ruled line area extracted in any other methods.

The above mentioned ruled line extracting process can be widely applied to a common line extracting process for recognizing not only slips, but also a line in drawings and a ruled line and graphics in an image.

Furthermore, the reverse-side determination in the ruled line extracting process can be applied to a process of extracting any pattern other than a ruled line. By applying the determination, an unnecessary reverse-side pattern can be removed from an extraction result, and only a necessary pattern can be extracted.

In this case, the pattern extraction apparatus first extracts a pattern candidate area, which is a candidate for a pattern area, from a gray scale image. Then, the change of the gray level in the tangent direction of the contour line of a pattern contained in the extracted pattern candidate area, and the change of the gray level in the direction vertical to the tangent direction are obtained.

Figure 27:
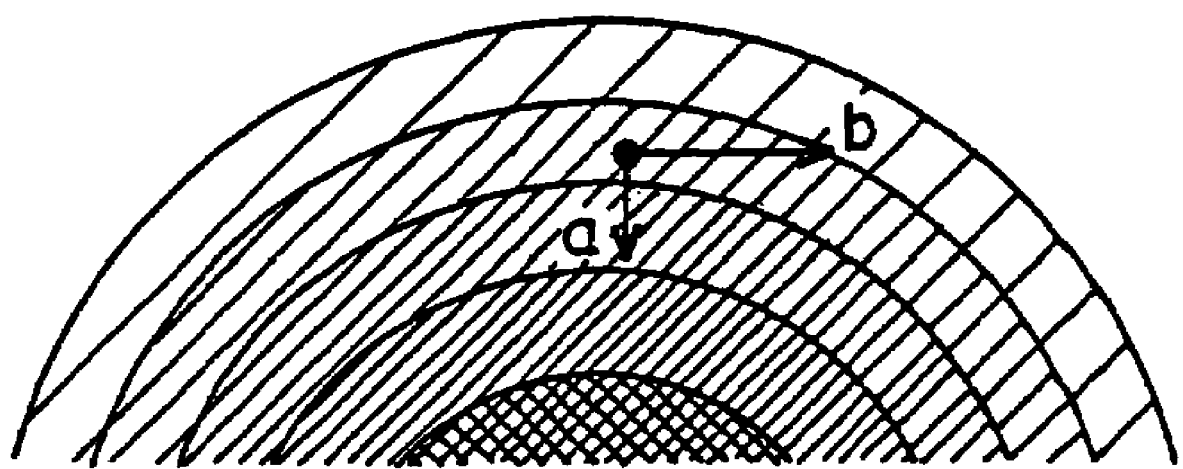
FIG. 27 shows the contour of a pattern candidate.

For example, when the contour portion of a pattern candidate area is shaped as shown in FIG. 27, the vertical direction a corresponds to the direction vertical to the tangent direction of the contour line of the pattern, and the horizontal direction b corresponds to the tangent direction of the contour line of the pattern. The method of computing the change of the gray level is the same as the method for a ruled line.

Then, it is determined whether the pattern candidate area is a pattern on the right side of paper or a reverse-side pattern using the value of [the change of the gray level in the direction vertical to the tangent direction/the change of the gray level in the tangent direction], or the change of the gray level in the direction vertical to the tangent direction as an evaluation value. Then, the area of a reverse-side pattern is removed, and an area of a right-side pattern is output as an extraction result.

In the above mentioned embodiment, a gray scale image is used as an example of a multiple-valued image. However, the ruled line extracting process and a pattern extracting process according to the present embodiment can be applied to any multiple-valued image including a gray scale image and a color image.

Furthermore, the ruled line extraction apparatus and the pattern extraction apparatus according to the present embodiment are configured using an information processing device (computer) 5 as shown in FIG. 28. The information processing device shown in FIG. 28 comprises a CPU (central processing unit) 101, memory 102, an input device 103, an output device 104, and external storage device 105, a medium drive device 106, a network connection device 107, and an image input device 108, which are interconnected through a bus 109.

The memory 102 includes ROM (read only memory), RAM (random access memory), etc., and stores a program and data used in a process. The CPU 101 performs a necessary process by executing a program using the memory 102.

The input device 103 can be, for example, a keyboard, a pointing device, a touch panel, etc. and is used in inputting an instruction from a user and information. The output device 104 can be, for example, a display, a printer, a speaker, etc., and is used in outputting an inquiry to a user and a process result.

The external storage device 105 can be, for example, a magnetic disk device, an optical disk device, a magneto-optical disk) device, a tape device, etc. The information processing device stores the above mentioned program and data in the external storage device 105, and loads them as necessary to the memory 102 to use them.

The medium drive device 106 drives a portable storage medium 110, and accesses the stored contents. The portable storage medium 110 can be any computer-readable storage medium such as a memory card, a floppy disk, CD-ROM (compact disk read only memory), an optical disk, a magneto-optical disk, etc. The user stores the above mentioned program and data in the portable storage medium 110, and loads them as necessary to the memory 102 to use them.

The network connection device 107 is connected to a communications network such as a LAN (local area network), etc., and converts data for the communications. The information processing device receives the above mentioned program and data from another device through the network connection device 107, and loads them as necessary to the memory 102 to use them.

The image input device 108 can be, for example, a scanner, an OHR, etc., and inputs a multiple-valued image to be processed.

Figure 29:
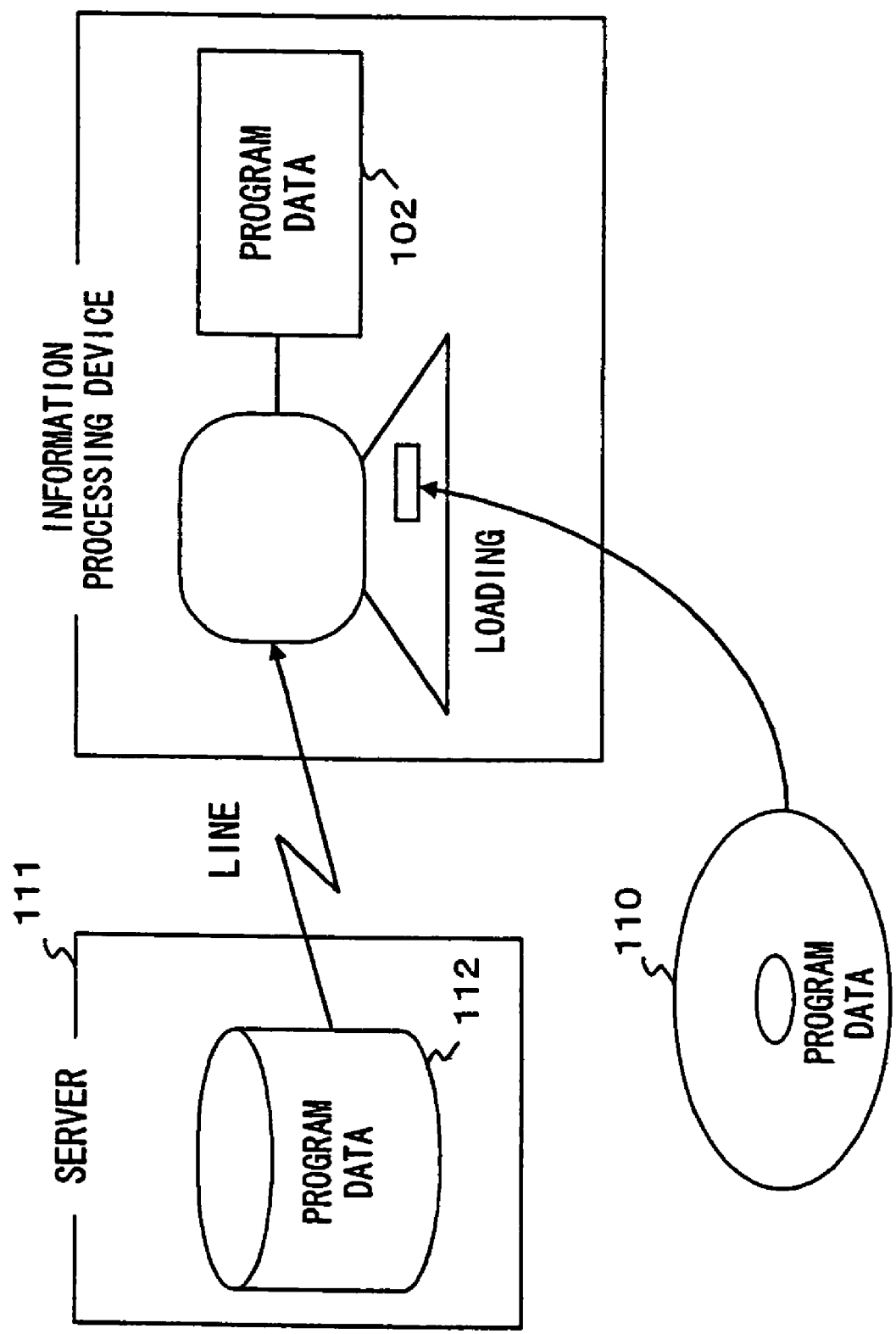
FIG. 29 shows storage media.

FIG. 29 shows computer-readable storage media capable of providing a program and data. The program and data stored in the portable storage medium 110, and a database 112 of a server 111 are loaded to the memory 102. At this time, the server 111 generates a propagation signal for propagating the program and data, and transmits them to the information processing device through any transmission medium in the network. Then, the CPU 101 executes the program using the loaded data, and performs a necessary process.

According to the present invention, a ruled line can be correctly extracted using two types of different binary images generated from a multiple-valued image for each purpose although there is a shadow in a multiple-valued image, there is little gray level difference between a ruled line and a background, etc. Therefore, a ruled line can be extracted from an image not only input from a scanner, but also input from a non-contacting type input device.

Furthermore, an unnecessary reverse-side pattern can be removed and only a necessary pattern can be extracted by applying the reverse-side determination to a pattern candidate area extracted from a multiple-valued image.

What is claimed is:

1. A ruled line extraction apparatus, comprising:
   an extraction device extracting from a page an area containing a pattern to be determined from a multiple-valued image;
   a determination device selecting each of a plurality of pixels in a contour portion of the area as a target pixel, selecting a first compared pixel in a direction vertical to the ruled line with respect to the target pixel, computing a first amount of the target pixel that is a gray level difference between the target pixel and the first compared pixel, computing an evaluation value based on the respective first amounts respectively computed for the plurality of pixels in the contour portion of the area, and determining, based on the evaluation value corresponding to a gray level change in a direction vertical to the tangent direction of the contour portion of the ruled line, whether the ruled line is written on a front side or a reverse side of the page in such a way that the area is determined to contain the ruled line written on the front side of the page if the evaluation value is equal to or larger than a predetermined value and the area is determined to contain the ruled line written on the reverse side of the page if the evaluation value is smaller than the predetermined value; and
   an output device outputting information about the area determined to contain the ruled line written on the front side of the page.

2. The ruled line extraction apparatus according to claim 1, wherein the determination device computes an average value of the respective first amounts as the evaluation value.

3. A ruled line extraction apparatus, comprising:
   an extraction device extracting from a page an area containing a pattern to be determined from a multiple-valued image;
   a determination device selecting each of a plurality of pixels in a contour portion of the area as a target pixel, selecting a first compared pixel in a direction vertical to the ruled line with respect to the target pixel, computing a first amount of the target pixel that is a gray level difference between the target pixel and the first compared pixel, selecting a second compared pixel in a direction parallel to the ruled line with respect to the target pixel, computing a second amount of the target pixel that is a gray level difference between the target pixel and the second compared pixel, dividing the first amount by the second amount to compute a quotient, computing an evaluation value based on the respective quotients respectively computed for the plurality of pixels in the contour portion of the area, and determining, based on the evaluation value corresponding to gray level changes in directions vertical to and parallel to the tangent direction of the contour portion of the ruled line, whether the ruled line is written on a front side or a reverse side of the page in such a way that the area is determined to contain the ruled line written on the front side of the page if the evaluation value is equal to or larger than a predetermined value and the area is determined to contain the ruled line written on the reverse side of the page if the evaluation value is smaller than the predetermined value; and
   an output device outputting information about the area determined to contain the ruled line written on the front side of the page.

4. The ruled line extraction apparatus according to claim 3, wherein the determination device computes an average value of the respective quotients as the evaluation value.

5. A ruled line extraction apparatus comprising:
   an extraction device extracting from a page a plurality of areas containing patterns to be determined from a multiple-valued image;
   a determination device selecting, for each of the plurality of areas, each of a plurality of pixels in a contour portion of the area as a target pixel, selecting a first compared pixel in a direction vertical to the ruled line with respect to the target pixel, computing a first amount of the target pixel that is a gray level difference between the target pixel and the first compared pixel, computing an evaluation value based on the respective first amounts respectively computed for the plurality of pixels in the contour portion of the area, dividing the plurality of areas to be determined into two groups based on distribution of evaluation values, and determining that an area to be determined which belongs to a group of a larger evaluation value contains a pattern of the ruled line written on a front side of the page, and determining that an area to be determined which belongs to a group of a smaller evaluation value contains a pattern of the ruled line written on a reverse side of the page; and
   an output device outputting information about the area determined to contain the pattern of the ruled line written on the front side of the page.

6. The ruled line extraction apparatus according to claim 5, wherein the determination device computes an average value of the respective first amounts as the evaluation value.

7. A method, comprising:
   extracting an area from a page that contains a digital pattern representing a straight line;
   selecting each of a plurality of pixels in a contour portion in the area as a target pixel;
   selecting a first compared pixel in a direction perpendicular to the straight line with respect to the target pixel;
   computing a first amount of the target pixel that is a gray level difference between the target pixel and the first compared pixel;
   computing an evaluation value based on the respective first amounts respectively computed for the plurality of pixels in the contour portion in the area;
   determining whether the evaluation value is at least a predetermined value; and determining, based on the evaluation value, whether the straight line is on the front or reverse side of the page if the evaluation value is at least the predetermined value, and if so determined, outputting data pertaining to the necessary straight line area.

8. The method according to claim 7, wherein an average value of the respective first amounts is computed as the evaluation value.

* * * * *

UNITED STATES PATENT AND TRADEMARK OFFICE
CERTIFICATE OF CORRECTION

PATENT NO.        : 7,440,618 B2                                            Page 1 of 1
APPLICATION NO. : 10/941863
DATED             : October 21, 2008
INVENTOR(S)       : Atsuko Ohara et al.

It is certified that error appears in the above-identified patent and that said Letters Patent is hereby corrected as shown below:

On the Title Page, Item (54) (Title), Line 1, change "RULES" to --RULED--.

Column 1, Line 1 (Title), change "RULES" to --RULED--.

Column 1, Line 5, change "now pending." to --now Patent No. 7,164,795.--.

Signed and Sealed this

Third Day of February, 2009

JOHN DOLL
*Acting Director of the United States Patent and Trademark Office*